United States Patent
Lee

(10) Patent No.: US 7,471,724 B2
(45) Date of Patent: Dec. 30, 2008

(54) METHOD AND APPARATUS FOR ADAPTIVE MULTIPLE-DIMENSIONAL SIGNAL SEQUENCES ENCODING/DECODING

(75) Inventor: Tsu-Chang Lee, Los Altos, CA (US)

(73) Assignee: ViChip Corp. Limited, Hsinchu (TW)

( * ) Notice: Subject to any disclaimer, the term of this patent is extended or adjusted under 35 U.S.C. 154(b) by 1027 days.

(21) Appl. No.: 10/867,447

(22) Filed: Jun. 14, 2004

(65) Prior Publication Data

US 2005/0013369 A1 Jan. 20, 2005

Related U.S. Application Data

(60) Provisional application No. 60/480,985, filed on Jun. 23, 2003.

(51) Int. Cl.
*H04B 1/66* (2006.01)

(52) U.S. Cl. .............. 375/240.12; 375/240.16; 375/240.15; 375/240.25; 375/240.14; 375/240.23; 375/240.26; 382/238; 382/235; 382/233; 382/239; 382/246

(58) Field of Classification Search ........... 375/240.12, 375/240.16, 240.15, 240.14, 240.25, 240.23, 375/240.26; 382/238, 235, 233, 239, 246
See application file for complete search history.

(56) References Cited

U.S. PATENT DOCUMENTS

| 5,790,206 | A * | 8/1998 | Ju .............................. 348/699 |
| 6,983,018 | B1 * | 1/2006 | Lin et al. ............... 375/240.16 |
| 7,046,916 | B1 * | 5/2006 | Morris et al. ............... 386/111 |
| 2003/0058949 | A1 * | 3/2003 | MacInnis et al. ....... 375/240.29 |
| 2004/0228410 | A1 * | 11/2004 | Ameres et al. ......... 375/240.18 |

* cited by examiner

*Primary Examiner*—Shawn An
(74) *Attorney, Agent, or Firm*—Jianq Chyun IP Office

(57) ABSTRACT

A hybrid block matching prediction and transform based n dimensional signal sequence encoder, including an encoder motion estimator, having a cost function. A first embodiment includes an entropy-based cost function. A second embodiment includes a fast block matching search (motion estimation) method to learn the results from neighboring blocks and perform a large range search with only a small number of points to visit. A third embodiment includes a method to dynamically adjust the cost function parameters and other selected coding control parameters based on encoder outputs to optimize the quality and performance of the encoder. A fourth embodiment includes a method to enable exploring and rapid processing of fractional grid points for n dimensional block matching search (motion estimation). A fifth embodiment includes a hybrid block matching prediction and transform-based n dimensional signal sequence decoder.

24 Claims, 22 Drawing Sheets

METHOD AND APPARATUS FOR ADAPTIVE MULTIPLE-DIMENSIONAL SIGNAL SEQUENCES ENCODING/DECODING

CROSS-REFERENCE TO RELATED APPLICATIONS

This application claims priority from a U.S. provisional patent application Ser. No. 60/480,985, filed on Jun. 23, 2003, entitled "Method and Apparatus for Adaptive Multiple-Dimensional Signal Sequences Encoding/Decoding," which is hereby incorporated by reference. This application is related to a co-pending U.S. utility patent application, filed on Jun. 14, 2004, entitled "Memory and Array Processor Structure for Multiple-Dimensional Signal Processing," which is hereby incorporated by reference.

BACKGROUND OF THE INVENTION

1. Field of the Invention

This disclosure relates generally to data encoding, storage, distribution, and decoding, and more particularly but not exclusively, to n dimensional signal sequence encoding, storage, distribution, and decoding by use of an n dimensional block matching prediction method.

2. Description of the Prior Art

Digital data systems are frequently challenged to handle large quantities of data quickly enough to meet practical needs. Compact disc music requires about 1500 kilobits per second, and video needs over 200,000 kilobits per second. Both transmission and storage of data is costly, and in some cases impossible. For example, a current telephone line modem can only carry maximum bit rate at 56 kilobits per second with a perfect line condition. Although video image frames need only be handled at approximately 30 cycles per second in order to allow an observer to have the impression of continual image transmission, the data content of each image frame is very large.

Solutions to the problem of quickly handling large quantities of data have been developed by using methods of data compression, i.e., methods of reducing the quantity of bits required. Data compression has made possible technological developments including digital television, DVD movie, streaming Internet video, home digital photography and video conferencing. Compressing coders and decoders (CO-DECs) are used to encode (at the capturing/production side) and decode (at the receiving/reproduction side) data containing statistical redundancy (as taught in chapter 3 of the book by Iain E. G. Richardson, entitled *H. 264 and MPEG-4 Video Compression—Video Coding for Next-Generation Multimedia*, published by John Wiley & Sons, Ltd., 2003, which is hereby incorporated by reference).

FIG. 1A is a simplified block diagram for describing a prior art method for compression of image sequence data with an encoder. This system includes an input image frame 4, a discrete cosine transform (DCT) 14, a quantizer Q module 15, a run-level coding module 19, a VLC entropy coding module 20, a motion estimation search (ME) module 5, a difference energy based cost function calculator 13, and a decoder 10. The decoder 10 includes a motion compensation module (MC) 11, an inverse DCT module $T^{-1}$ 12, and a frame buffer 3 for one or more frames. The motion compensation (MC) module 11 produces a motion compensated prediction (MCP) 17, which provides one of the inputs for the frame buffer 3 and discrete cosine transform (DCT) module 14. The motion estimation search (ME) module 5 outputs a motion vector MV 7 to both the VLC entropy coding module 20 and the motion compensation (MC) module 11. The motion estimation search (ME) module 5 also receives as inputs the input image frame 4, the decoded reference frame 6, to search for the best location from the reference frame(s) according to certain cost function. At each search point, ME module 5 sends the information 21 about the current block and target block at the search point to the cost function calculator 13, and receives the calculated cost value 22 from the difference energy based cost function calculator 13. After the search, the motion estimation search (ME) module 5 outputs a motion vector MV 7 to both the VLC entropy coding module 20 and the motion compensation (MC) module 11.

An image frame is input to the encoder 1 and the data is encoded. The encoded frame 2 is then transmitted to a transmission channel or storage media (not shown), and a copy of the encoded frame is decoded at the decoder 10 and stored as a reference frame in the frame buffer 3. The next, current input image frame 4 is then input to the encoder 1. The encoder 1 then searches the reference frame 6 for a closest match point in the reference frame for each block of a plurality of blocks that make up the current frame, using the motion estimation search (ME) module 5, by calculating what is termed an "energy difference" measure, such as sum of square error or sum of absolute error between the current frame block and corresponding reference frame block located at each search point in the reference frame. The best matched location is then represented as a "motion vector" 7, specifying the two dimensional location displacement of the block in the reference frame relative to the corresponding block in the current frame. Also, the difference 8 between the best match blocks in the reference frame and the current frame is determined. This difference 8 is called the "Block Prediction Difference" (BPD), or "Residue 8." Both the motion vector 7 and the residue 8 are then encoded and transmitted. The encoder 1 will then also decode the motion vector 7 and residue 8 and reconstruct the current frame in the same way that a decoder to which the data is sent would reconstruct the frame, and then store this frame as a reference frame. The prior art describes variations for the simplified process described in FIG. 1A.

A very significant issue is the amount of computational power that is required by the encoder in accomplishing the task of finding the best match for each block in the current frame, i.e., determining the displacement vector such that the displacement block in the reference frame is most "similar" to the current block. One prior art method of performing this task involves searching every possible block location within a pre-defined search area. This method requires astronomical computing power and is not feasible for practical real time implementation. There are many simplified methods to search a fraction of the large and complete search space to reduce the computation cost. However, the simplified methods usually have significant quality loss of the encoded video related to the "full search" encoder, and cannot provide consistent compression quality close to the "full search" encoder on all real life cases. Furthermore, all of the search methods in the prior art (including the full search method) select the best match block location primarily by calculating some type of "energy difference" measure, such as the "sum of square error", or "sum of absolute error" between pixels of the block in the current frame and the block at each search location in the reference frame. In general, the target of the encoder is to minimize the bit rate to achieve certain acceptable quality. The currently used "energy difference" based measure does not necessarily give the best quality and bit rate in the encoded image sequence. What is needed is an improved data compression and motion estimation technology which can achieve minimized bit rate with good quality with practical and efficient computing cycles.

SUMMARY OF THE INVENTION

The present invention is a method and apparatus to effectively compress multiple-dimensional signal sequences to reduce the necessary bit-rate within certain distortion constraints. This method can be used to encode general n dimensional signal sequences, such as one-dimensional, two-dimensional, and three-dimensional signals.

A first aspect of the invention is directed to block matching based prediction in n dimensional signal sequence encoding/decoding system. The system includes: an n dimensional block scanner to scan the blocks from the input frame according to a pre-defined sequence, an n dimensional frame buffer to store at least one frame in a sequence for prediction, having at least one reference frame other than the current frame in the sequence for prediction, where n is a positive integer; an n dimensional motion estimator (or called block matching searcher), which is capable to determine the reference displacement index referring to a prediction block in the reference frames from a current block to achieve at least one target system objective; a block encoder to encode the block prediction difference (or called residue) between the current block and the prediction block and encode a reference displacement index; and a sequence encoder to wrap the encoded blocks together into a selected format.

A second aspect of the invention is directed to a block matching prediction based video signal sequence encoding/decoding system. The system includes: a video frame buffer to store at least one video frame in a sequence for prediction, having at least one reference frame other than the current frame in the sequence for prediction; a two dimensional motion estimator (or block matching searcher), which is capable to determine the reference displacement index referring to a prediction block in the reference frames from a current block to achieve at least one target system objective; a block encoder to encode the block prediction difference (residue) between the current block and the prediction block, and encode a reference displacement index; a sequence encoder to wrap the encoded blocks together into a uniquely defined format; and means for calculating entropy, where entropy measures the amount of information needed to encode the current block, calculated from at least one reference frame.

A third aspect of the invention is directed to a method to compress a sequence of n dimensional signal frames. The method includes: storing at least one n dimensional frame in a sequence for prediction, having at least one reference frame other than the current frame in the sequence for prediction, where n is a positive integer; achieving at least one target system objective by using an n dimensional motion estimator (block matching searcher), which is capable of determining the reference displacement index referring to a prediction block in the reference frames from a current block; encoding the block prediction difference between the current block and the prediction block and encoding a reference displacement index; and wrapping the encoded blocks together into a selected format.

A fourth aspect of the invention is directed to a method to conduct a motion estimation search for a current block in a current frame selected from a set of two dimensional frames. The method includes: evaluating a set of points based on a set of motion vectors of a set of neighboring blocks, for each block in a current frame, to determine a starting point, selecting a detail search starting point derived from the set of motion vectors in the neighboring blocks of each block, detail searching by detail evaluating a region in the current frame around the best starting point derived from a neighborhood exploit set, globally searching a large region in the current frame, and repeating these operations for each block in the current frame. The searching uses an entropy based cost function.

DETAILED DESCRIPTION OF THE PREFERRED EMBODIMENT

The present invention is a method and apparatus to effectively compress multiple-dimensional signal sequences to reduce the necessary bit-rate with certain distortion constraints. This method can be used to encode general n dimensional signal sequences, such as one-dimensional, two-dimensional, and three-dimensional signals. One important application of this method is in video encoding for transmission and storage purposes. Because of this, in many of the descriptions below, the two dimensional video signal sequence compression is illustrated. However, the method and apparatus taught here can be extended to compress a general sequence of n dimensional signals, where n is a positive integer.

N Dimensional Block Matching Signal Sequence Encoding/Decoding

Figure 1A:
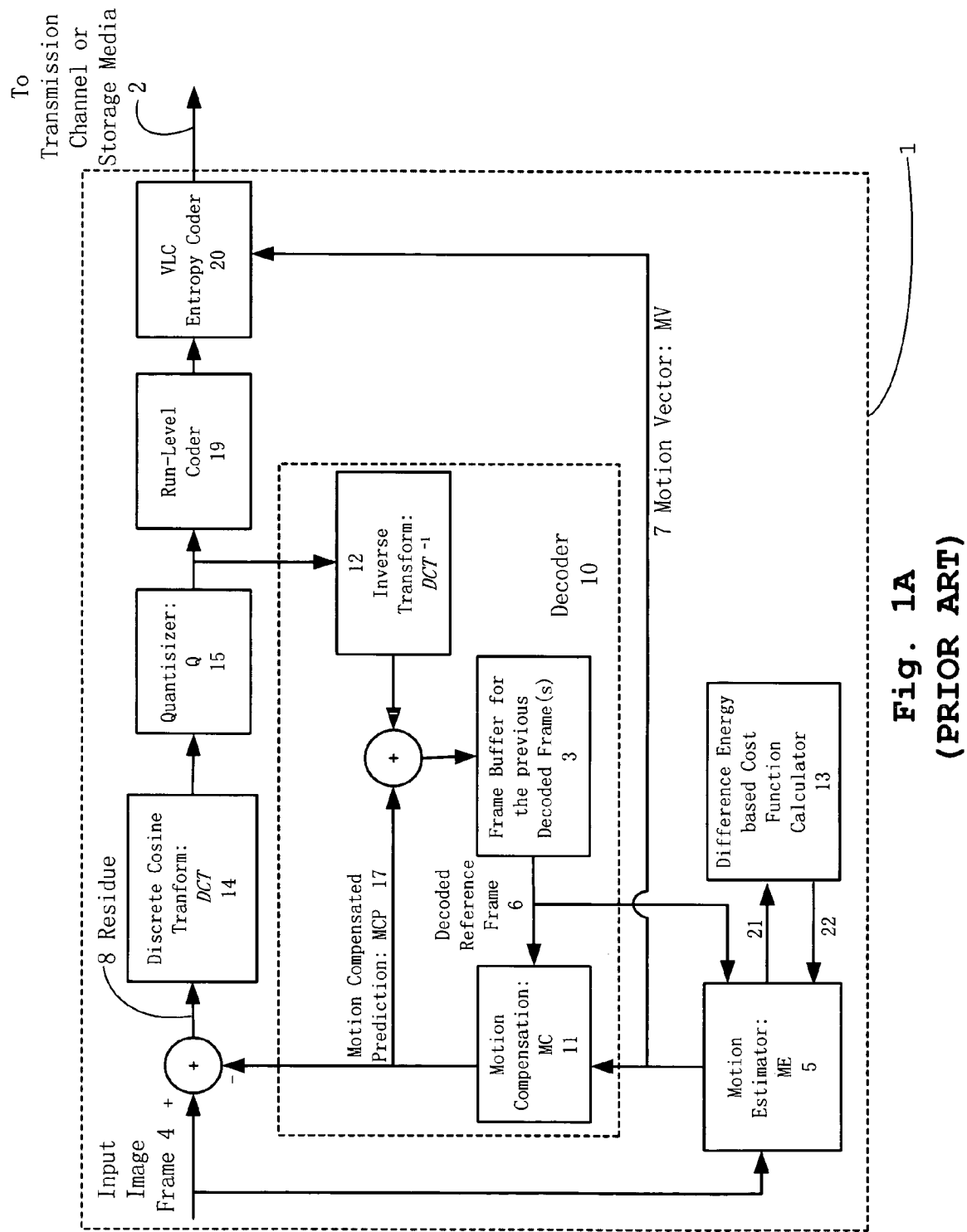
FIG. 1A illustrates a data compression system, in accordance with the prior art.
Figure 1B:
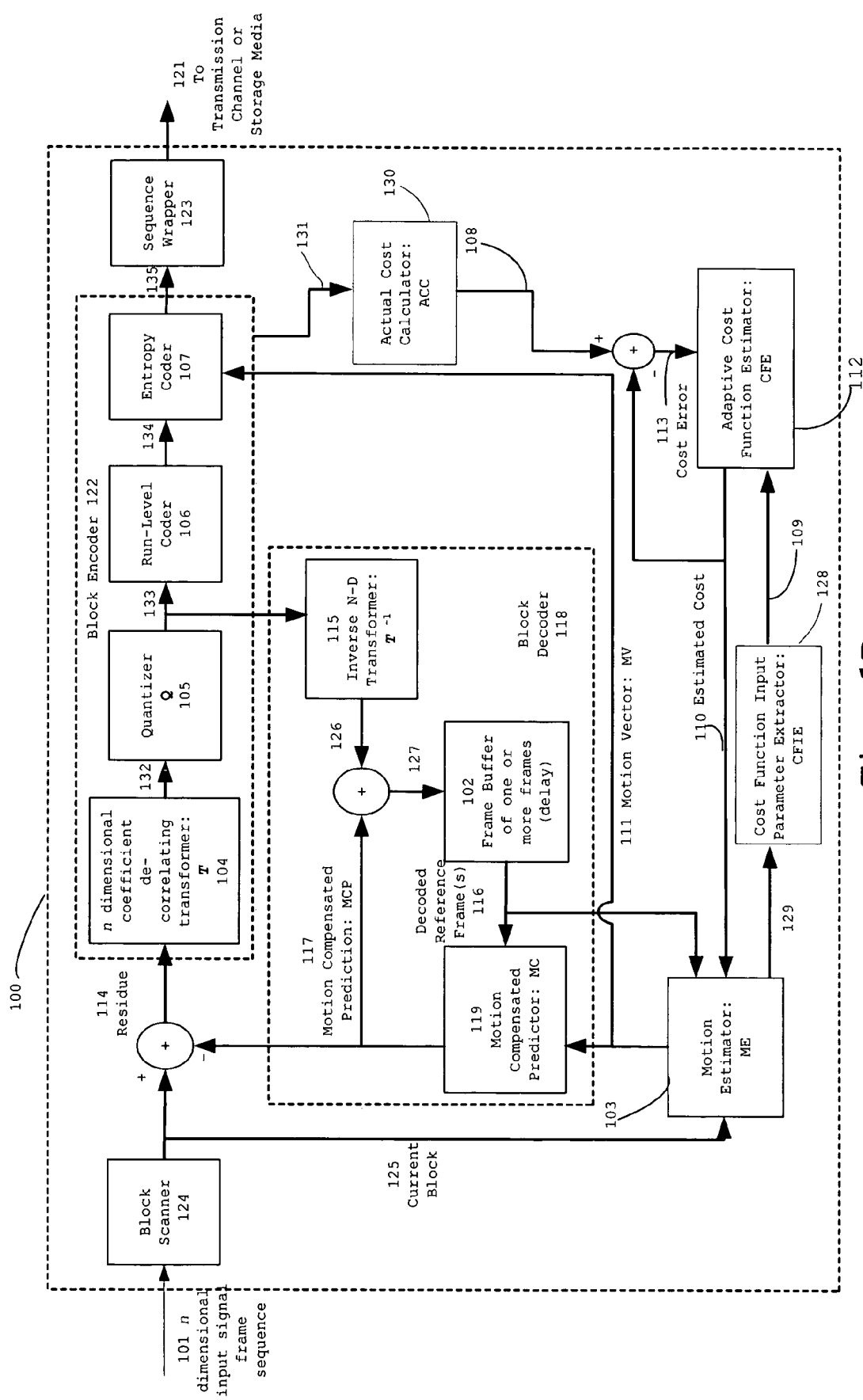
FIG. 1B illustrates a block diagram of an adaptive multi-dimensional signal sequence encoding system, in accordance with one embodiment of the present invention.
Figure 15:
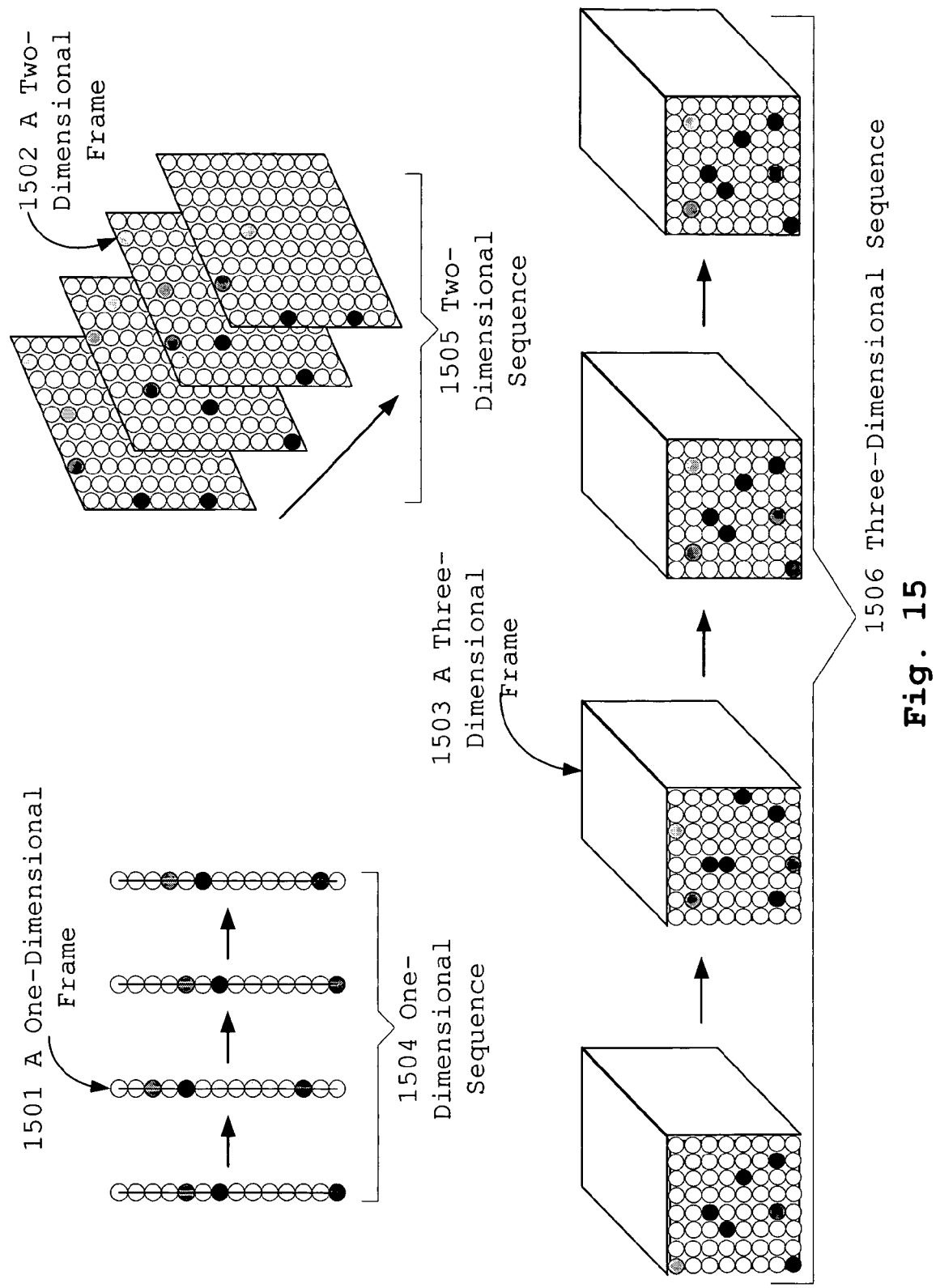
FIG. 15 illustrates a one dimensional, two dimensional and three dimensional frame and sequence, in accordance with one embodiment of the invention.
Figure 17:
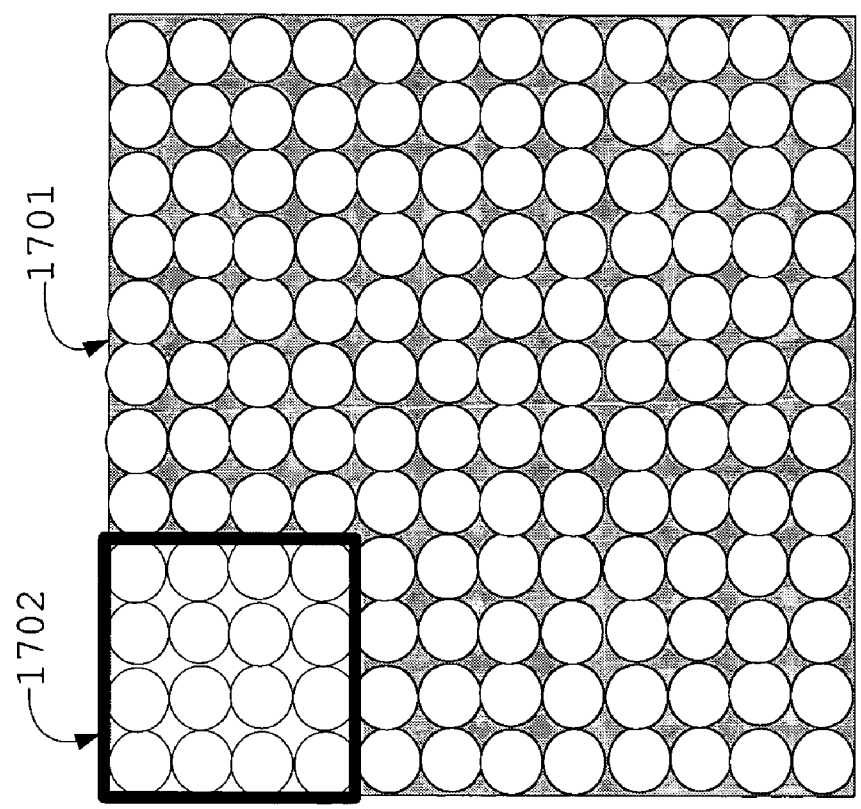
FIG. 17 illustrates a block in a two dimensional frame, in accordance with one embodiment of the invention.

FIG. 1B illustrates a block diagram of one embodiment of an adaptive multi-dimensional signal sequence encoder 100 (also called a sequence encoder), in accordance with one embodiment of the present invention. The system can compress an n dimensional signal sequence (1504, 1505, and 1506 in FIG. 15 are some examples of n dimensional sequences). The input to the system is an n dimensional signal frame (see FIG. 15 for some examples, such as 1501, 1502, and 1503). The frame is composed of n dimensional blocks (FIG. 17 shows an example of a two-dimensional block 1702 in two-dimensional frame 1701). This adaptive multi-dimensional signal sequence encoding system includes an n dimensional input signal frame 101, a block scanner 124, a current block 125, a residue (or block prediction difference (BPD)) 114, an n dimensional coefficient de-correlation transformer T 104, an optional quantizer Q module 105, a run-level coder 106, an entropy coder 107, a motion estimator (or block matching searcher) (ME) 103, an adaptive entropy based cost function estimator 112, and a block decoder 118.

The block decoder 118 includes a motion compensated predictor (MC) 119, an inverse (N-D) transform module ($T^{-1}$) 115, and a frame buffer 102 of one or more frames. The motion compensated predictor (MC) 119 produces a motion compensated prediction (MCP) 117, which provides the predicted data for the current block 125. MCP 117 is added with the output 126 from the inverse N-D transform module ($T^{-1}$) 115 to re-construct the decoded current block 127, which is one of the inputs for the frame buffer 102 to reconstruct the previously encoded frames. This MCP 117 is also deducted from the current block 125 to generate the residue (or called block prediction difference–BPD) 114, which is an input to the n dimensional coefficient de-correlating transformer T module 104.

The n dimensional coefficient de-correlating transformer T module 104 transforms the n dimensional residue matrix 114 through some coefficient de-correlating transform to generate the transformed residue matrix 132, which is an input to the optional quantizer Q module 105 to quantize the coefficients in the transformed residue matrix 132 to generate a quantized transformed residue matrix 133, which is a sparse matrix with zeros in most of the matrix entries. The quantized transformed residue matrix 133 is output to a run-level coder 106 and the inverse N-D transformer 115. The run-level coder 106 scans through the frequency components in the quantized transformed residue matrix 133 according to a selected order of the n dimensional special frequency to produce a sequence of (run, level) symbols 134. This sequence of (run, level) symbols 134 and motion vector 111 are inputs to the entropy coder 107 to generate the entropy code 135 for the current block 125.

The motion estimator search (ME) module 103 outputs a motion vector—MV (or called reference displacement index) 111 to both the entropy coder 107 and the motion compensated predictor (MC) 119. The motion estimator (ME) 103 also receives as inputs the current (n dimensional) block 125, and the decoded reference frame(s) 116, to search for the motion vector MV 111 to minimize a selected search cost function.

At each search point, the motion estimator ME 103 output certain search state data 129 (which could include search option, MV value, current block and reference block data, and similar information) to the cost function input parameter extractor (CFIE) 128, which then generates the cost function input parameters 109 for the adaptive cost function estimator (or simply cost function estimator CFE) 112. The adaptive cost function estimator CFE 112 takes as inputs the parameters 109 extracted from CFIE 128 to calculate the estimated cost 110 required to encode the current block. The estimated cost 110 is sent to the motion estimator 103 for best motion vector selection. The cost function estimator CFE 112 also receives as input the error for the estimated cost 113 to adjust certain internal parameters or states to improve the estimation accuracy. The cost error 113 is derived from the actual cost 108 coming out from the encoder results, and the estimated cost 110. The actual cost calculator ACC 130 takes actual cost calculator input data 131 (which is based on final status information from the block encoder 122 after completing the block encoding) to calculate the actual cost 108, which is sent into the cost function estimator CFE 112 as feedback to improve the estimation accuracy.

As illustrated in FIG. 1B, the system keeps a set of decoded frames in the frame buffer 102. The current block 125 from the input frame 101 is matched against the displaced blocks at search points in the frames (called the "reference frames") inside the frame buffer 102 according to certain cost function. To better track the signal changes from frame to frame, the block size can be variable.

One embodiment of this invention uses different block sizes and shapes to match the blocks in the reference frames. Larger blocks are used to track the "movement" of larger objects, and smaller blocks are used to track the "movement" of smaller objects. This block-matching step is called "Motion Estimation" in two-dimensional video encoding cases. "Motion Estimation" and "Block Matching Search" are used interchangeably in the following descriptions.

After the best target block is found, the residue matrix 114 representing the difference between the current block 125 and the predicted block MCP 117 is transformed through an n dimensional coefficient de-correlating transform T module 104, and in one embodiment of the invention the transformed coefficients are quantized through an quantizer Q 105, then encoded together with the motion vector information.

In an alternative embodiment of the invention, the quantizer Q 105 can be omitted if "Lossless" encoding is required, where the encoding process is reversible, i.e., the original signal sequence can be recovered by the block decoder 118 with 100% accuracy.

In the video compression case, since human eyes have a limited precision, some quantization is feasible without influencing the human perception. The quantization is set up in such a way that the quantization error is not noticeable by human eyes. In a typical video compression system, the transform T is a two-dimensional Discrete Cosine Transform (DCT), (as taught in chapter 6 of a book by Iain E. G. Richardson, entitled *Video Codec Design*, published by John Wiley & Sons, Ltd., 2002, which is hereby incorporated by reference).

Experimental results show that a DCT can generate close to optimal coefficient de-correlation results. However, due to computation complexity, DCT is typically applied on small fixed blocks (8×8 in the MPEG4 case, and 4×4 in the H.264 case). To achieve larger block size and save computation time, one embodiment of this invention uses the Discrete Hadamard Transform (DHT), as the coefficient de-correlating transform. DHT is not as optimal as DCT in terms of de-correlating the coefficients (according to chapter 8 of a book by Douglas F. Elliott and K Ramamohan Rao, entitled *Fast Transforms: Algorithms, Analyses, Applications*, published by Academic Press, 1983, which is hereby incorporated by reference). However, since DHT only requires the addition and subtraction operations, a much larger block size is possible and the complexity is drastically reduced from DCT.

One embodiment of the invention uses a variable block size for the transform and uses different transforms for different block sizes. As an example, DCT will transform small blocks, and DHT will transform larger blocks. Variable block size transforms permit the block size for the transform to be the same as the block size in motion estimator to generate the better coefficient de-correlating effects than the small fixed block size transforms.

The quality of the encoded video is controllable by the quantizer Q 105 (as shown in FIG. 1B), which "quantizes" the transformed coefficients into discrete levels based on a quantization parameter (QP). The larger the QP, the small the number of levels that are required, and hence a smaller number of bits are required to represent the coefficients. QP is carefully adjusted to balance the rate-distortion trade-offs in reduced quality. After the quantization step, many coefficients in the transformed residue matrix become zero. To reduce the bit rate, the quantized transform coefficients in the quantized transformed residue matrix 133 are scanned through a selected zigzag scanning method, which scans the coefficients from the low frequency components to high frequency components, or in the reverse direction. This step converts the n dimensional coefficients into one-dimensional sequences.

The scanned one-dimensional sequence is then encoded through run-level coder 106, which generates the (number of leading zero, value of non-zero coefficient) symbol sequence 134 information. This sequence of (run, level) symbols is then encoded through an entropy coder 107 (e.g., Huffman or Arithmetic coding) to further reduce the rate. The entropy coder 107 performs entropy encoding on the sequence of (run, level) sequence symbols 134 and the motion vector 111, and combines them to generate the encoded block 135.

Figure 19A:
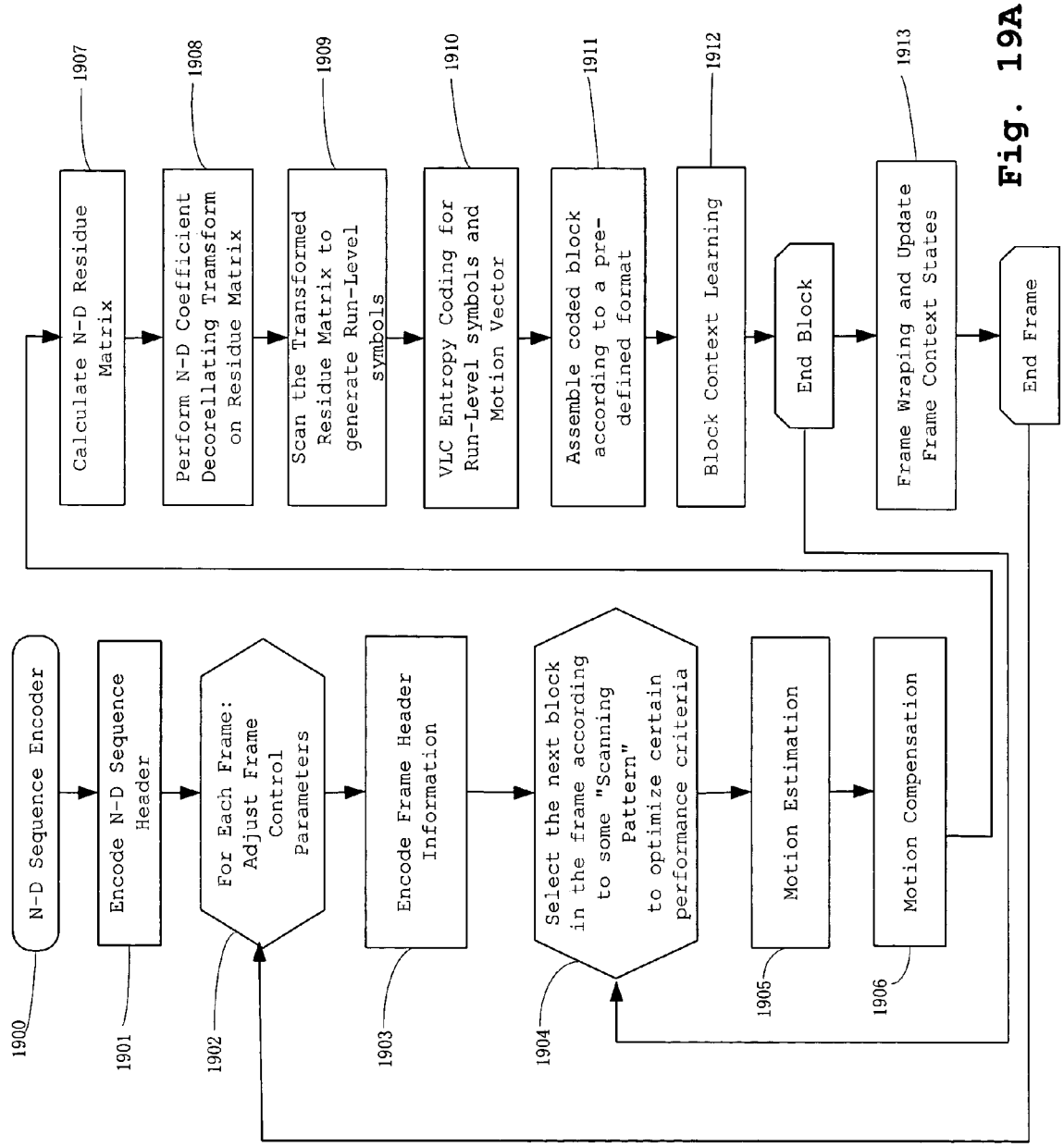
FIG. 19A illustrates the encoding flowchart for n dimensional encoding, in accordance with one embodiment of the invention.
Figure 19B:
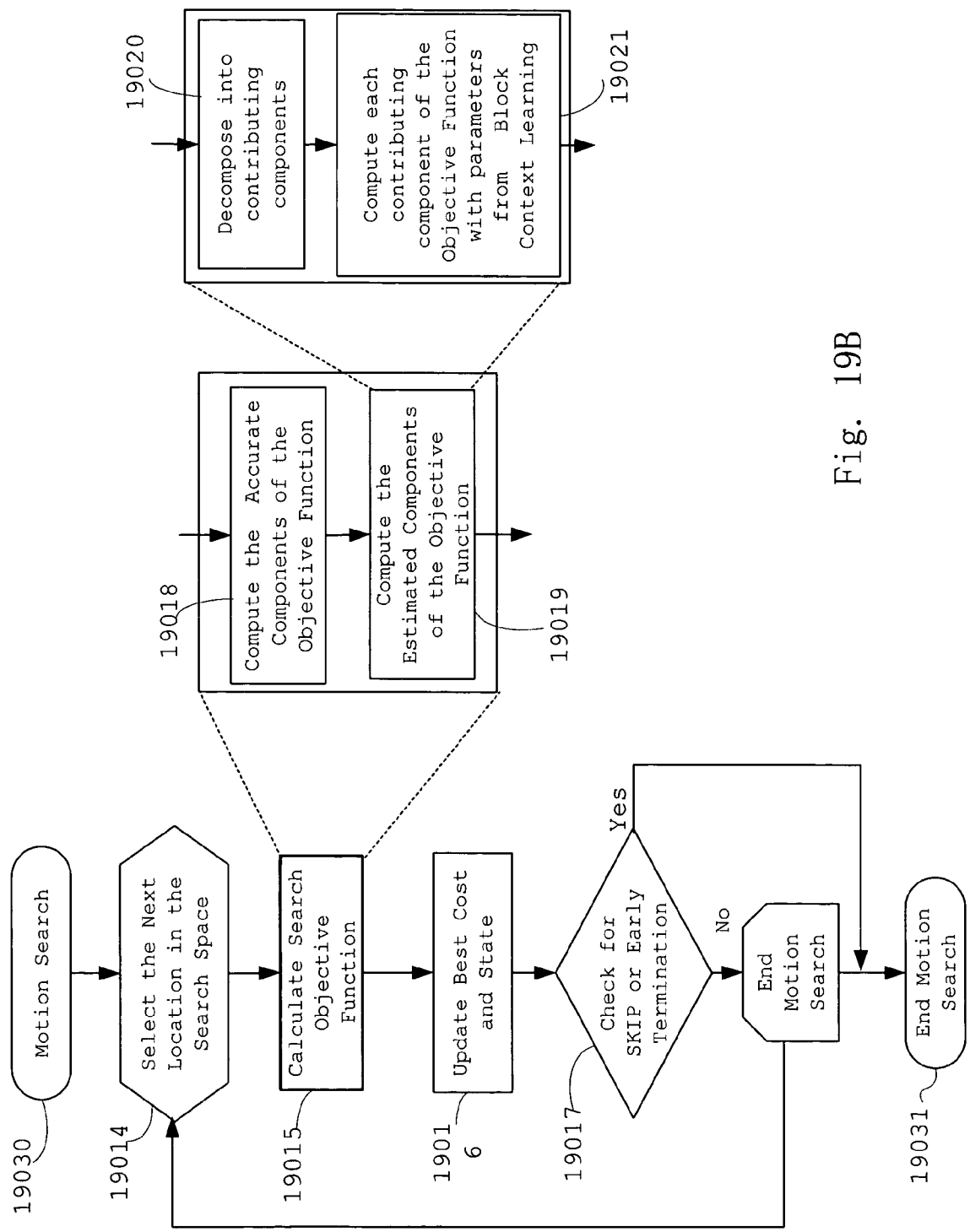
FIG. 19B illustrates the motion search flowchart for an n dimensional encoding, in accordance with one embodiment of the invention.

The encoded block information is fed into the sequence wrapper to wrap the encoded blocks into n dimensional frame sequence. The output from the sequence wrapper 123 is the encoded frame sequence 121, which can be sent to transmission channels or storage media. The overall flow of an n dimensional signal sequence encoding process is illustrated in FIGS. 19A and 19B, discussed below.

Figure 1C:
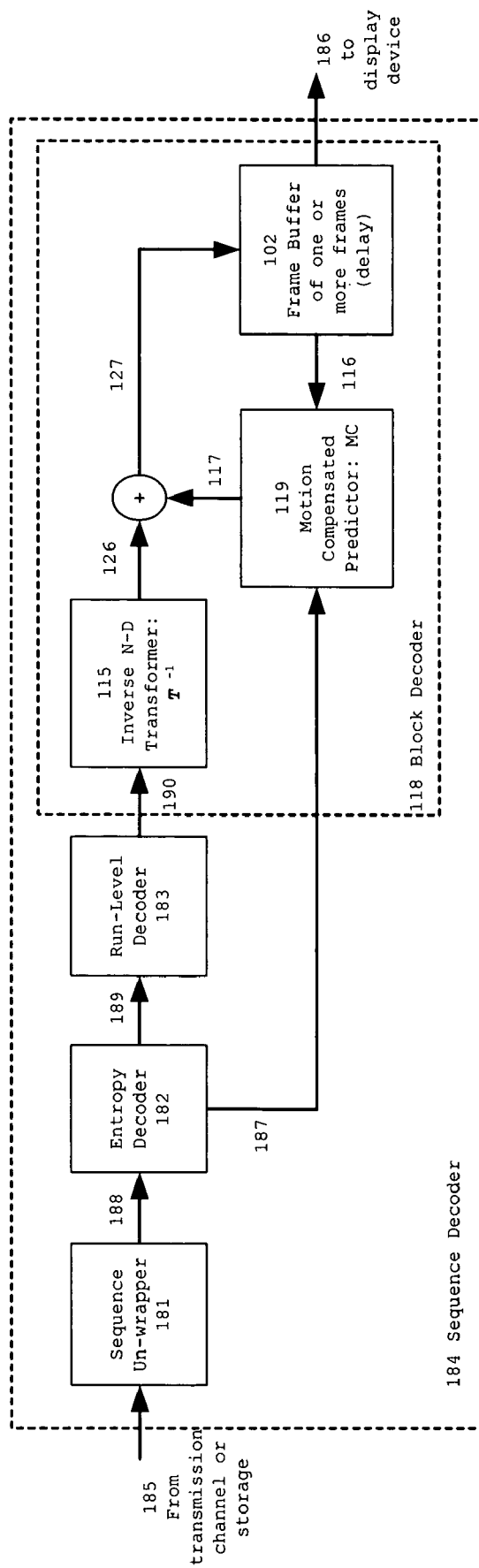
FIG. 1C illustrates a block diagram of a multi-dimensional signal sequence decoding system, in accordance with one embodiment of the present invention.

The n dimensional signal sequence decoding process is much simpler than the encoding process. FIG. 1C shows he structure for the n dimensional sequence decoder. The block decoder 118 has already been described in the previous description of FIG. 1B. The sequence un-wrapper 181 un-wraps the encoded frame sequence data into encoded blocks 188. The entropy decoder 182 decomposes each encoded block into a motion vector 187 and a sequence of sequence of (run, level) symbols 189. The run-level decoder 183 reconstructs the transformed residue matrix 190 from the sequence of (run level) symbols.

Motion Estimation (ME) Cost Function

The most computational intensive module in the system illustrated in FIG. 1B is the "Motion Estimator (ME)" (or block matching searcher) module 103. In the past, the ME (block matching search) is based on minimizing the error measure between the current block and the target displaced blocks in the reference frames. The error measure is typically specified in some kind of "difference energy measure" like "Sum of Square Error (SSE)" or "Sum of Absolute Error (SAE)" between the pixels of the two blocks, with SAE as the mostly widely used measure for ME search, to save computation time (as taught in chapter 6 of a book by Iain E. G. Richardson, entitled *Video Codec Design*, published by John Wiley & Sons, Ltd., 2002, which is hereby incorporated by reference).

Using a "difference energy measure" like SAE or SSE does not generate the minimum bit rate. Instead, "entropy measure", which measures the amount of information (in terms of number of bits) needed to encode the current block, given the reference frames, should be used as the primary cost function guiding the ME searches to find the best target block. This is because in most of the source signal encoding case, the target of encoder is to obtain the minimum bit rate under certain quality (or distortion) restriction.

One embodiment of the invention includes a method to guide the ME search to find the minimum entropy for the target block. Since entropy information for the current block cannot be exactly calculated until the block encoding is completed, if we select the entropy as the search cost function, the difficulty is to find an accurate estimation of the entropy during the ME search step. An adaptive cost function estimator CFE addresses this issue. One embodiment of this concept is described in the following. Let J be the estimated cost for our target search objective. J can be decomposed into two main portions:

$$J = Ja + Je \tag{1A}$$

where Ja is the portion of the cost value (in the final target cost C), which can be accurately determined at this estimation stage; Je is the portion of the cost value which cannot be accurately determined at this stage. Furthermore, we can represent Je as the following parameterized function:

$$Je = Je[\{\text{model parameters}\}](\{\text{input variable}\}) \tag{1B}$$
$$= Je[K1, K2, \ldots](X1, X2, \ldots)$$

where $Je = C - Ja$, and Je is a parameterized model function to estimate the uncertain portion for the target cost C. $\{X1, X2, \ldots\}$ are input variables to the cost estimation function Je, and $\{K1, K2, \ldots\}$ are the model parameters for the cost estimation function Je.

To achieve a good estimation, the cost function input variables $\{X1, X2, \ldots\}$ are extracted from certain search state information during the ME search. As shown in FIG. 1B, we have a cost function input parameter extractor CFIE 128 taking the relevant current search state data 129 to generate the values of the input variables for the cost function J. Note that after finishing encoding the current block, the estimated portion of the cost can be accurately calculated as Ce=C−Ja, since C can be accurately determined after the block encoding. With Ce, we can than apply supervised learning algorithm to train and adapt the model parameters {K1, K2, ...} to enhance the estimation accuracy.

One embodiment of the invention applies the least mean squares (LMS) algorithm to adjust the model parameters {K1, K2, ...} (as taught in chapter 6 of the book by Bernard Widrow and Samuel D. Stearns, entitled *Adaptive Signal Processing*, published by Prentice-Hall, Inc. in 1985, which is hereby incorporated by reference). LMS can be considered a single layer neural network structure, which has certain limit in its functional modeling power.

To achieve better estimation accuracy, another embodiment of the invention uses multiple layer neural network models to learn the functional relationship between the cost function input variables and the target search objective cost. For example, one model is the multi-layer neural network model taught by Tsu-Chang Lee in the paper entitled *A Multi-Layer Feed-Forward Neural Network With Dynamically Adjustable Structures*, in the Conference Proceedings of the 1990 IEEE International Conference on Systems, Man, and Cybernetics published by IEEE Press., PP. 367-369.

The selection of cost function input variables {X1, X2, ...} are very critical for the accuracy and computation efficiency of the system. The following are criteria to select the cost function input variables:

Cost Function Input Parameter Selection Criteria:
- C1—Simplicity criteria: The input variables have to be easily extractable from the search states during the ME search process
- C2—Relevancy criteria: The input variables have to be selected based on the degree of relevancy to the target objective cost
- C3—Divide and conquer refinement criteria: Decompose a cost function J into separable contributing component functions J1, J2, ...
- C4—Input variables factoring criteria: Decompose a input parameter Xi into separable contributing components Xi1, Xi2, ... to create more input variables for better accuracy and control/tracking
- C5—Simple substitute criteria: If one input parameter Xi is difficult to obtain or too expensive to calculate, it can be substituted by a simpler variable Xi'.

One embodiment of the innovative framework outlined above, uses the ME cost function specified as:

$$J=Rate\_T(T(residue)|QP)+Rate\_MV(MV) \quad (2)$$

where Rate_*( ) is the number of bits for the signal through each of its own encoding method such as Rate_T, Rate_MV, etc.; T(residue) is the transform of the residue matrix 114 (or "Block Prediction Difference" BPD); and QP is the quantization parameter.

In one embodiment of the invention, J is evaluated by finding an approximation of Rate_T(T(residue)|QP) during the ME search process, since Rate_MV( ) can be easily determined through a table lookup, we now have Ja=Rate_MV( ) and Je=Rate_T(T(residue)|QP), which can be decomposed into frequency bands for estimation (according to cost function input parameter selection criteria C3, C4).

$$Rate\_T(T(residue)|QP)=\Sigma_{i=0-k}Rate(T\_Band\_i(residue)|QP)+Rate(High\_Freq) \quad (3A)$$

where Rate(T_Band_i(residue)|QP), i=0−k is the rate for frequency band i in the transformed residue matrix, and Rate (High_Freq) is the bits required to encode the remaining high frequency components above band k.

In most current video compression cases, DCT is used to transform the residue matrix to de-correlate the residue matrix coefficients. One embodiment uses the first few low frequency DCT energy sub-bands and the remaining total high frequency energy as input variables for the residue rate estimation function. Since it is more expensive to calculate the DCT, we can use some simpler transforms, such as the Hadamard Transform for the energy band estimation purpose (according to cost function input parameter selector criteria C5). In the very simple case, when k=0, equation (3A) becomes:

$$\begin{aligned}Rate\_T(T(FPD)|QP) &= Rate\_T\_DC(T\_DC(residue)|QP\_dc) + \\ &\quad Rate\_T\_AC(T\_AC(residue)|QP\_ac) \sim = \\ &\quad Rate\_T\_DC(DC(residue)|QP\_dc) + \\ &\quad Rate\_T\_AC(AC\_Norm(residue)|QP\_ac)\end{aligned} \quad (3B)$$

where T_DC(residue) is the DC component of T(residue), T_AC(residue) is the AC matrix derived from removing the DC term from the transformed residue matrix T, and DC(residue) is the DC value of the residue matrix.

Ideally, we would want to use the energy of T_AC(residue) as input parameter to estimate Rate_T_AC( ). However, it would require performing the DCT transform on the T(residue) matrix. Since DCT is an energy preserving transform in L2 sense (meaning the energy will be preserved if the measure is defined as Sum of Square of the matrix elements—SS). Hence, if we take the SS of the AC matrix of the residue before transform, it would yield the same energy as taking the transform. To further simplify the computation, we can use Sum of Absolute Value—SA of the AC matrix as an approximation (this is again an application of cost function input parameter selection criteria C5). SA of the AC matrix is called AC_Norm(residue), and is the Norm value of the AC matrix for the residue matrix:

$$AC\_Norm(FPD)=\Sigma_{ij}ABS(FPD_{ij}-DC(FPD)) \quad (4)$$

Figure 2:
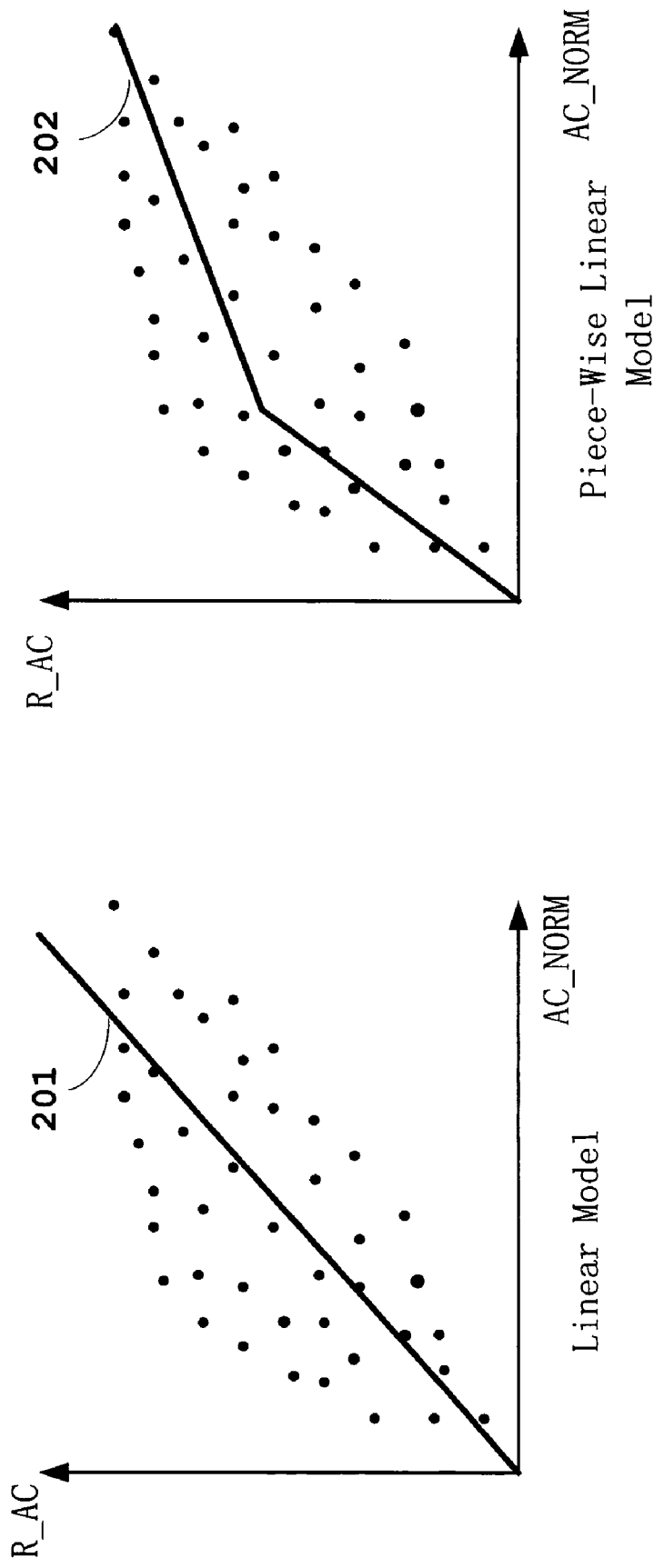
FIG. 2 illustrates parameter fitting by linear and piece-wise linear models, in accordance with one embodiment of the invention.

This provides an approximation for the entropy measure:

$$J=R\_DC(DC(residue)/QP\_dc)+R\_AC(AC\_NORM(residue)/QP\_ac)+R\_MV(MV) \quad (5)$$

where R_DC( ) and R_MV( ) can be evaluated accurately through simple table lookups; and R_AC( ) can be approximated through the parameterized cost function Je described earlier. The relationship between R_AC and AC_NORM depends on the coding methods used, and in one implementation of the invention, can be fitted by linear (201) or piecewise linear (202) models, with AC_Norm and R_AC as the x and y axes, respectively, as illustrated in FIG. 2.

In one embodiment of the invention applied to MPEG4, the following approximation for R_AC( ) is used:

$$R\_AC(AC\_NORM|QP\_ac)=AC\_NORM/(2*QP\_ac) \quad (6A)$$

In another embodiment of the invention, the following linear model is used:

$$R\_AC(AC\_NORM(FPD)|QP\_ac)=K*AC\_NORM/QP\_ac \quad (6B)$$

In general, K would vary based on local statistics of the FPD. One embodiment of the invention can determine the local statistical relationship between R_AC and AC_NORM, by using an adaptive method to dynamically adjust the K factor specified above.

Figure 3:
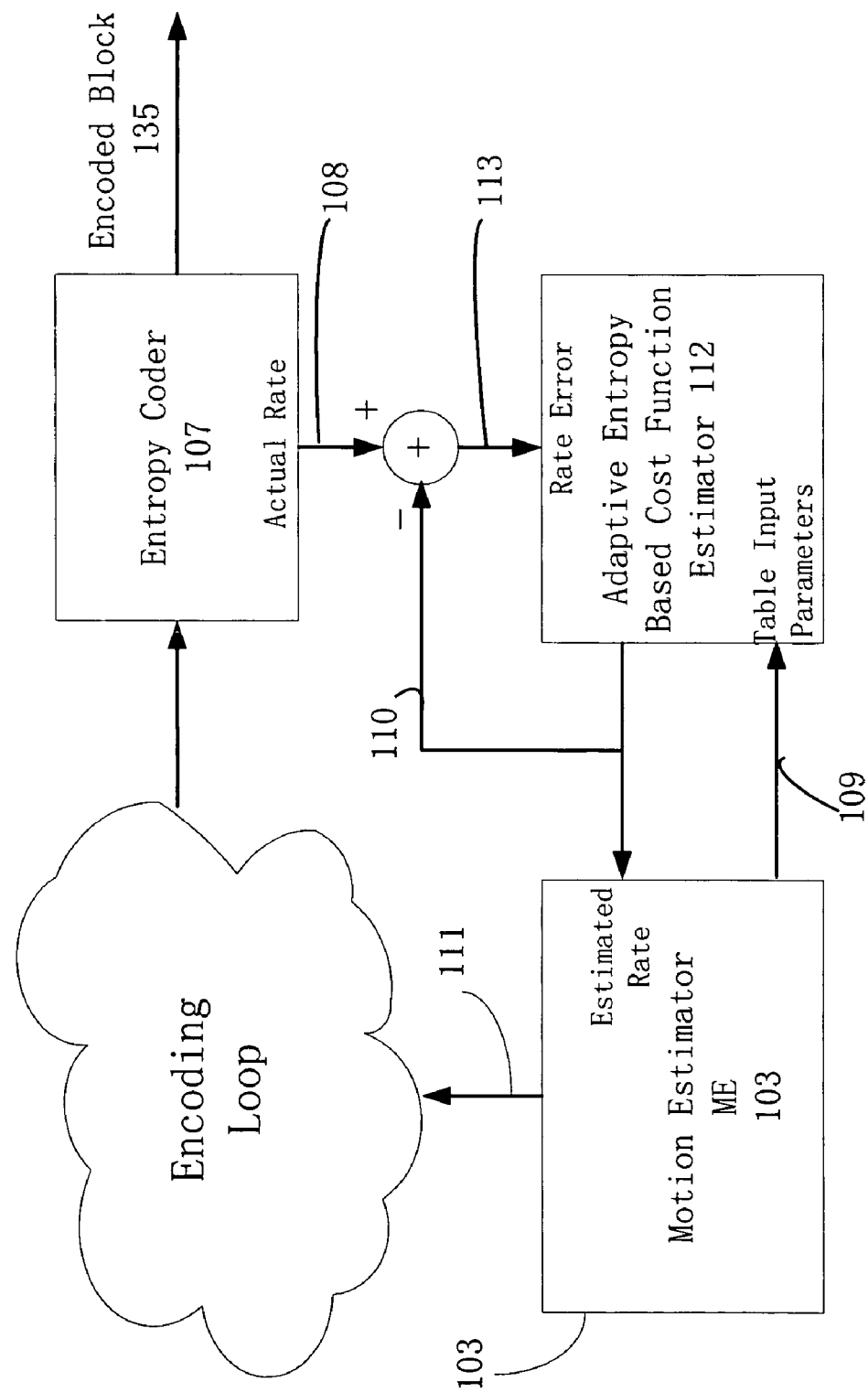
FIG. 3 illustrates an adaptive rate lookup table and evaluator structure, in accordance with one embodiment of the invention.

FIG. 3 (also shown as part of FIG. 1B) shows an embodiment of the adaptive cost function estimator structure described earlier. Here the cost function is entropy based, i.e., the target objective cost for ME (block matching search) is to minimize the number of bits required to encode the current block. FIG. 3 includes a motion estimator ME 103, an encoding loop, an entropy coder 107 and an adaptive entropy based cost function estimator 112. During the ME search process, the entropy (rate) is estimated through entering a set of input parameters 109 to the adaptive entropy based cost function estimator 112. For each block, the actual encoded rate 108 from the entropy coder 107 will be compared with the estimated rate 110, and the rate error 113 will be fed back to the adaptive entropy based cost function estimator 112 to adjust the cost function model parameters to reduce the rate error 113. Again, following the function estimation framework described earlier, the entropy based cost function can be decomposed into two portions, as specified below:

$$J\sim = R\_Accurate + R\_Estimation \quad (7)$$

R_Accurate is the portion of the rate that can be accurately determined based on certain input parameters.

In one embodiment of the invention, R_Accurate contains R_DC and R_MV, i.e., $$R\_Accurate = R\_DC(DC/QP\_dc) + R\_MV(MV) \quad (8A)$$

R_Estimation is the estimated portion of the block and in general is dependent on a set of input parameters to the lookup table.

In general, R_Estimation is dependent on certain set of characteristic parameters $\{X_i\}$ related to the current block:

$$R\_Estimation = F(X_1, X_2, \ldots) \quad (8B)$$

After entropy coder 107 in FIG. 1B, the rate can be accurately calculated. With R_Actual 108, we can adjust the function F( ) using some learning algorithms.

In one embodiment of the invention, R_Estimation is estimated as a linear combination of the block characteristic parameters, i.e., $$R\_Estimation = \Sigma_i K_i * (X_i - \Theta_i) \quad (9)$$

where $\{X_i\}$ are the input parameters, $\{\Theta_i\}$ are the threshold of input parameters, and $\{Ki\}$ are the weight factors.

One embodiment of the invention applies the LMS learning algorithm (as taught in chapter 6 of the book by Bernard Widrow and Samuel D. Stearns, entitled *Adaptive Signal Processing*, published by Prentice-Hall, Inc. in 1985, which is hereby incorporated by reference) to train the weight factors $\{K_i\}$ through, and keep the threshold values $\{\Theta_i\}$ pre-fixed or dynamically adjustable.

One embodiment of the method specified above can accurately look up the R_DC( ), R_MV_X( ), and R_MV_Y( ) (and R_MV_F( ) for multiple frame reference cases, as used in H.264), and adaptively adjust the K factor for R_AC( ) using the linear model. In this case:

$$J = R\_DC(DC/QP\_dc) + R\_MV(MV) + K*(AC\_NORM - AC\_THRESHOLD)/QP\_ac \quad (10)$$

Let R be the rate of the block after entropy coding (including the rate for DCT and MV), and let J be the estimation of the rate of the block, then K can be adjusted through the following procedure:

$$\Delta K = \mu*(R-J)*(AC\_NORM - AC\_THRESHOLD)/QP\_ac \quad (11)$$

where $\Delta K$ is the adjustment of K factor; (R−J) is the rate error; μ is the learning factor, usually set in such a way to balance the convergence speed and stability; AC_THRESHOLD is the threshold value characterizing the minimum AC_NORM value where AC Rate remains non-zero. AC_THRESHOLD can be pre-fixed to certain value or dynamically adjustable.

In one embodiment of this invention, AC_THRESHOLD can be adjusted according to the following process (specified in C computer language pseudo code, as taught in Appendix D of the book by Tsu-Chang Lee, entitled *Structure Level Adaptation for Artificial Neural Network*, published by Kluwer Academic Publishers, Inc. in 1991, which is hereby incorporated by reference):

```
Zero_Point = Th0;
for each block {  // block processing loop
  ...
    If {Actual AC Rate == 0} {
        Zero_Point = α * AC_NORM + (1 − α ) * Zero_Point;
        AC_THRESHOLD = m * Zero_Point;
    }
}
``` where Zero_Point is a variable tracking the zero rate AC_NORM locations; Zero_Point is initialized to the value Th0 at the beginning of the process; α is an averaging window control factor, which is a small positive number larger than zero; m is a scaling factor to control the location of the AC_THRESHOLD based on the average Zero_Point value.

It can be shown that the method to adjust K in (11) will minimize the mean square error of the rate function:

$$\min E\{(R-J)^2\} \quad (12)$$

In general, multiple parameters determine R_Estimation, as specified in (9), in which case the following adaptation method for K factors can be used:

$$\Delta K_i = \mu*(R-J)*(X_i - \Theta^i), \text{ for each } i \quad (13)$$

If more accurate estimation is needed, more advanced learning method, like Neural Network algorithm can be used to learn the functional relation between R_Estimation and $\{X_i\}$.

One embodiment applies the multi-layer neural network learning algorithm (taught by Dr. Tsu-Chang Lee in the paper entitled *A Multi-Layer Feed-Forward Neural Network With Dynamically Adjustable Structures*, in the Conference Proceedings of the 1990 IEEE International Conference on Systems, Man, and Cybernetics published by IEEE Press., pp. 367-369.) to train the system.

The entropy based cost function (5) will in general create a lower bit rate and better subjective image quality compared with "Difference Energy Measure" based cost functions. It should be noted that the adaptive cost function estimation method and structure taught in the above texts, shown in FIG. 1B and FIG. 3 can be applied to any cost function, which can include any kind of system objective parameters, including rate, distortion, or even some overall system performance indexes, like computing cycle, power consumption, and similar performance indexes. It should also be noted that the adaptive cost function estimation method and structure taught in the above texts, shown in FIG. 1B and FIG. 3, can be used to dynamically adjust the cost function estimator to improve the system quality and performance while the encoding system 100 is encoding n dimensional signal sequences. The method taught here can also be used to structure, organize, or train the estimator based on pre-collected statistic samples before actual deployment to perform the encoding task.

ME Searching Method

To search for the optimal point yielding the lowest cost function value demands the searching of a large region. The computation cost is usually prohibitively high to support real time applications. One embodiment of the invention uses a method to perform large region ME search to create close to full search results with less than 1% of computation time comparing with a full search. This method is based on the fact that inside most frames in real world n dimensional frame sequences (as in typical video samples), there are only a small number of motion vector clusters and the motion vector field is continuous varying from blocks to blocks inside each cluster. Based on this fact, the motion vectors from the neighboring blocks can provide a good starting point for a ME search.

Adaptive systems developed to learn neighborhood correlation in the physical data set and map the relationship into some processing structure was developed before. In the journal paper written by Tsu-Chang Lee, entitled *Adaptive Vector Quantization Using a Self-Development Neural Network*, in IEEE Journal On Selected Areas In Communications, Vol.8, No.8, published by IEEE Communication Society on October 1990, pp. 1458-1471, the author taught a method to encode general source signals efficiently using a neighborhood preserving neural network structure. It was shown in that paper, that by exploiting the data relationship in the neighborhood data set, the code book search efficiency and rate-distortion performance can be drastically enhanced.

One embodiment of this invention is to generalize similar concepts discussed in the preceding journal paper and apply them specifically to the ME search problems for the n dimensional signal sequence encoding. The basic idea is to exploit the special co-relation among neighborhood sets in the n dimensional sequence of encoded blocks.

Figure 4:
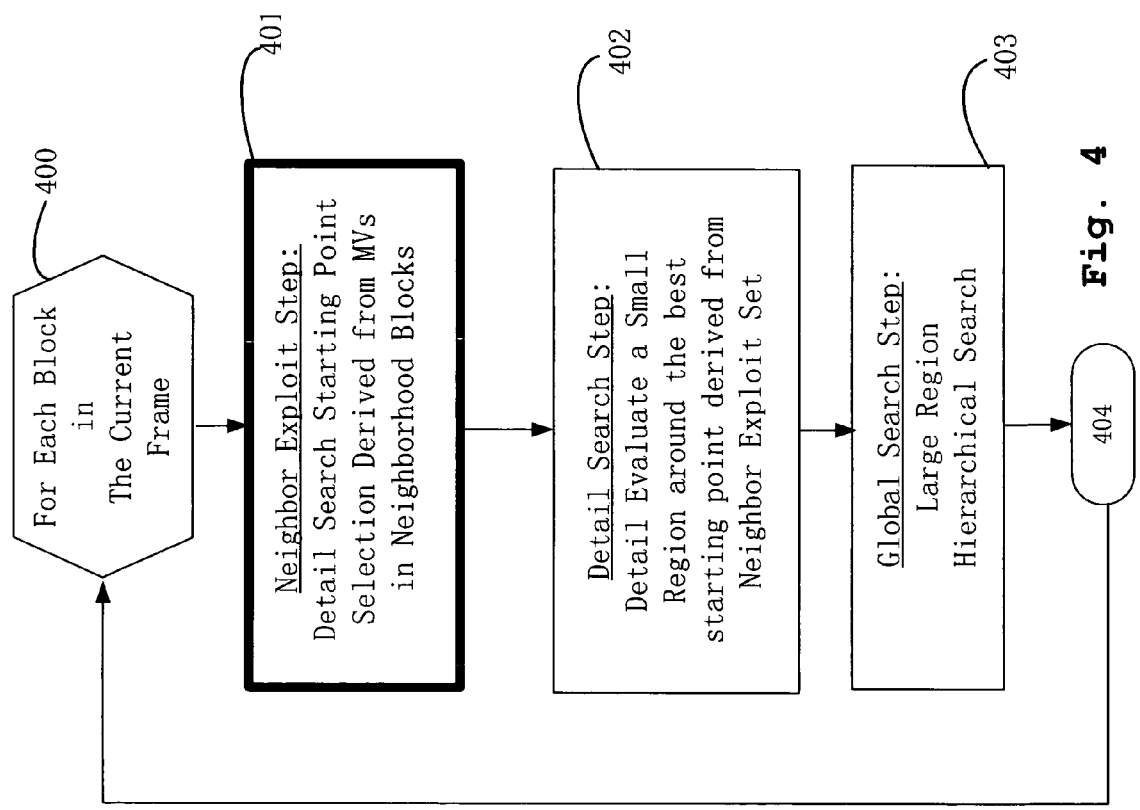
FIG. 4 illustrates a fast ME search procedure, in accordance with one embodiment of the invention.
Figure 6:
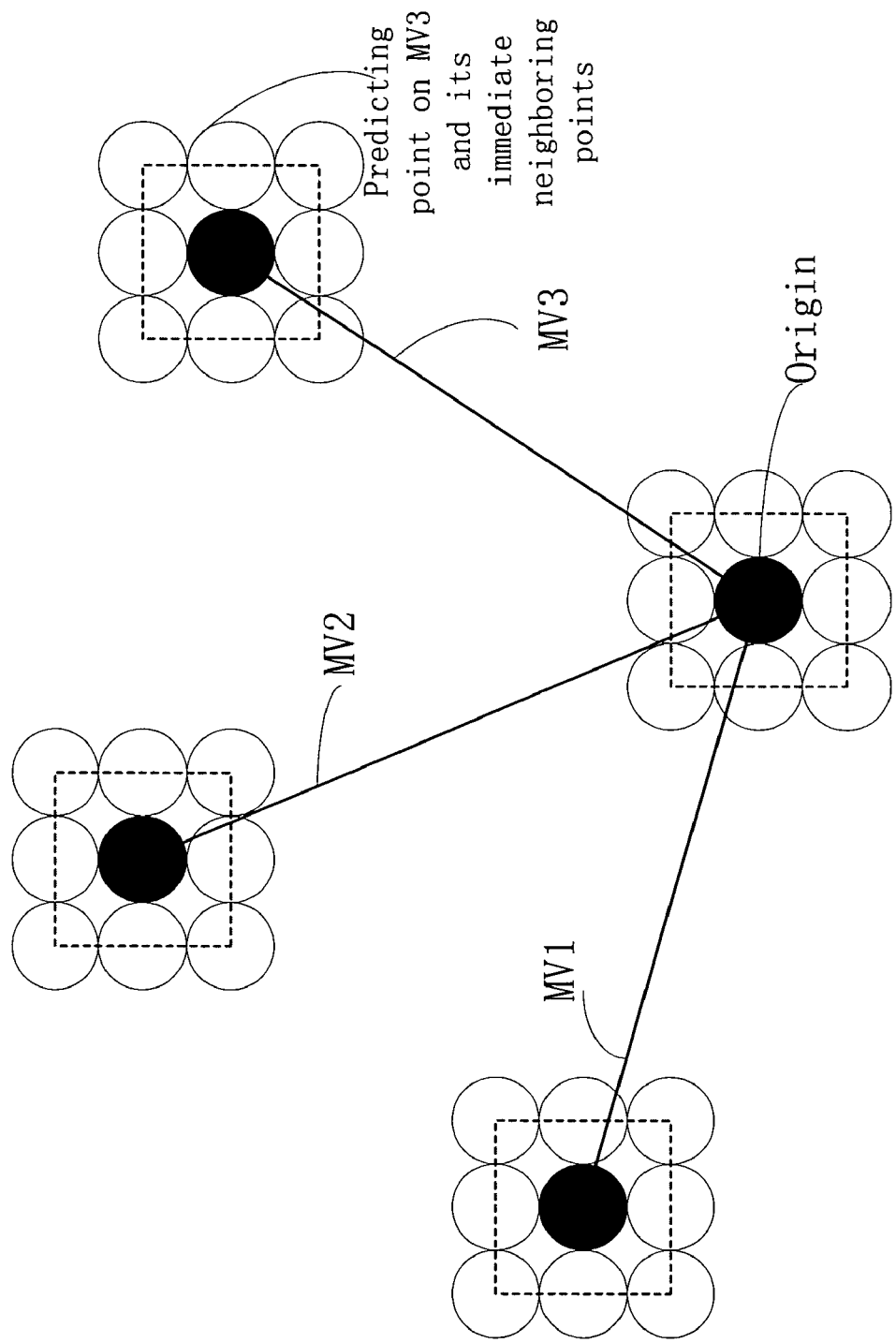
FIG. 6 illustrates the evaluation of a set of points, based on the motion vectors of the neighboring blocks, in accordance with one embodiment of the invention.

FIG. 4 shows one embodiment of a fast ME search procedure, in accordance with one embodiment of the invention. First, a set of points can be evaluated, based on the Motion Vectors of the neighboring (possibly neighbors in the space domain and the time domain) blocks (the "Neighbor Exploit Set"), and optionally the immediate neighboring points surrounding those points, as illustrated in FIG. 6), to determine the starting point of the detail search (step 401 in FIG. 4). This step is followed by the detail search step 402, which includes a detail evaluation of a small region around the best starting point derived from the neighbor exploit set. Step 403 is next, which includes a global search step involving a large region hierarchical search. Step 404 is next, which is followed by step 400 for each block in the current frame.

Figure 5:
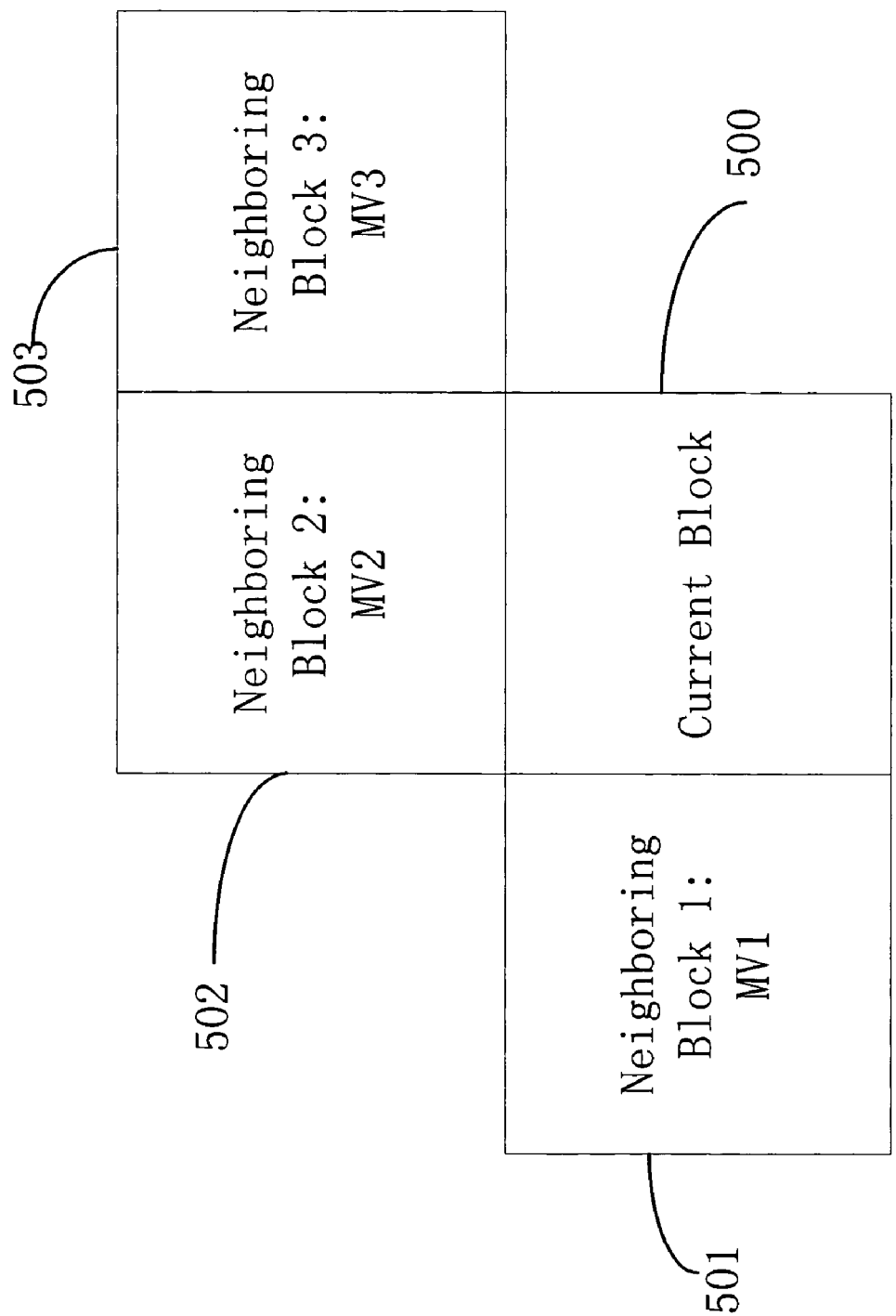
FIG. 5 illustrates a two-dimensional video sequence application with motion vectors from the three neighboring blocks used to determine a motion estimation search starting point, in accordance with one embodiment of the invention.

FIG. 5 shows one example of applying this method to two-dimensional video sequence case. First, the system goes through the neighbor exploit step, where the MVs from the three neighboring blocks: Left 501, Up 502, Up-Right 503, and Origin, are used to determine the ME search starting point for the current block 500. The search locations pointed by the MVs and the immediate neighboring locations together compose the Neighbor Exploit Set (as shown in FIG. 6) for the current block. The search point yielding the lowest cost value is selected as the starting point for the detailed ME search. After the Neighborhood Exploit Step, the next step is the detail search step (402 in FIG. 4). The purpose of the detail search is to do a thorough evaluation of the points surrounding the detail search starting point, which was selected based on evaluating the points in the Neighbor Exploit Set.

Figure 7:
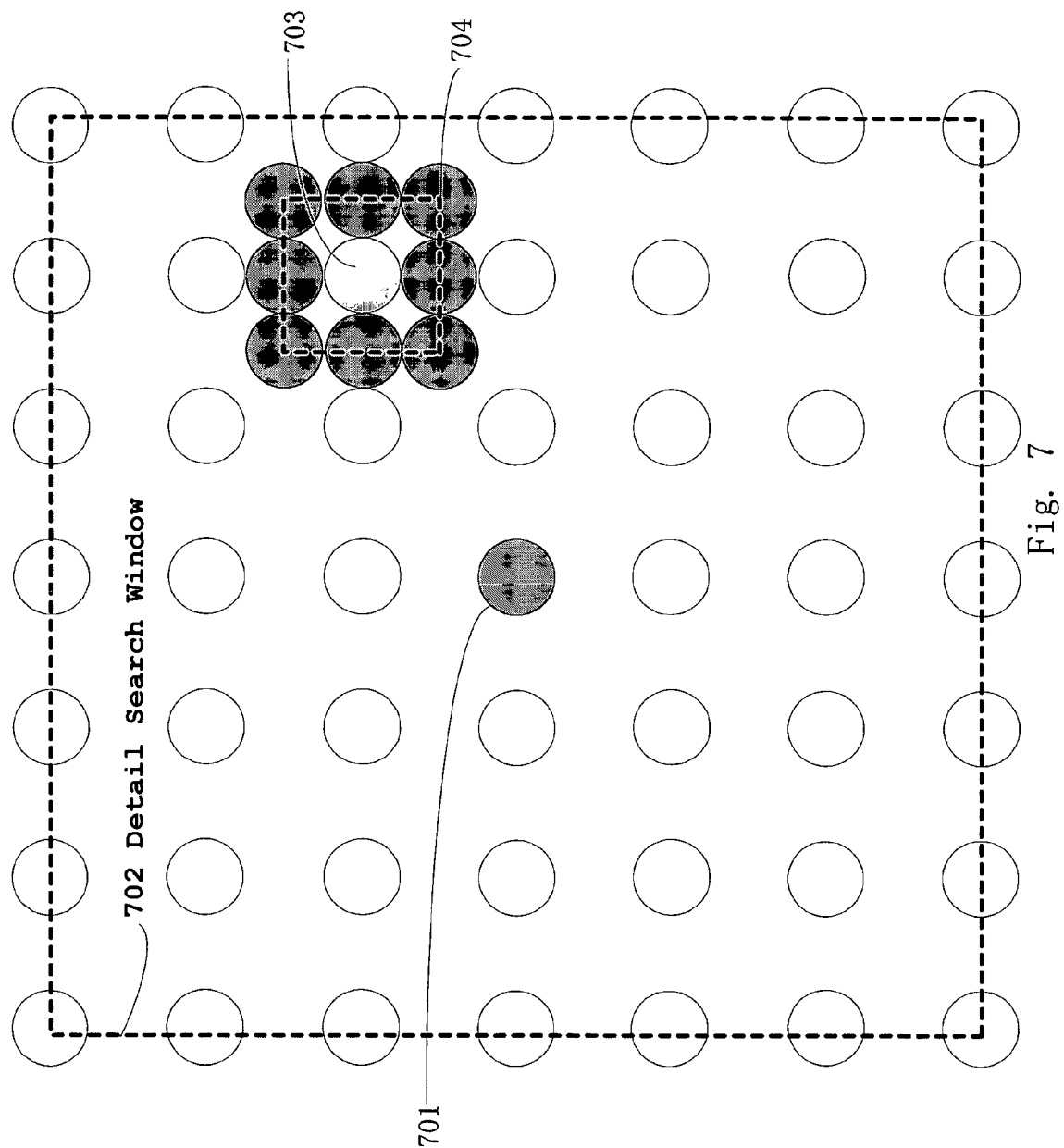
FIG. 7 illustrates an evaluation of the points surrounding a detail search starting point, in accordance with one embodiment of the invention.

FIG. 7 shows a specific embodiment of this step. Here, a two level search is performed within a small region 702 surrounding the search starting point 701. In level 1, the ME search is performed for every other points. After the best point 703 at level 1 is determined, its immediate neighboring points 704 in level 0 are evaluated to determine the best point. Let the best cost-function value found so far be J_Best.

After the detail search, we then move forward to the large region hierarchical search (step 403 in FIG. 4)—the global search step. The purpose of this is to sample the points in a large search window to find motion vectors outside the detail search region in case the neighboring blocks do not provide accurate initial starting point.

Figure 8:
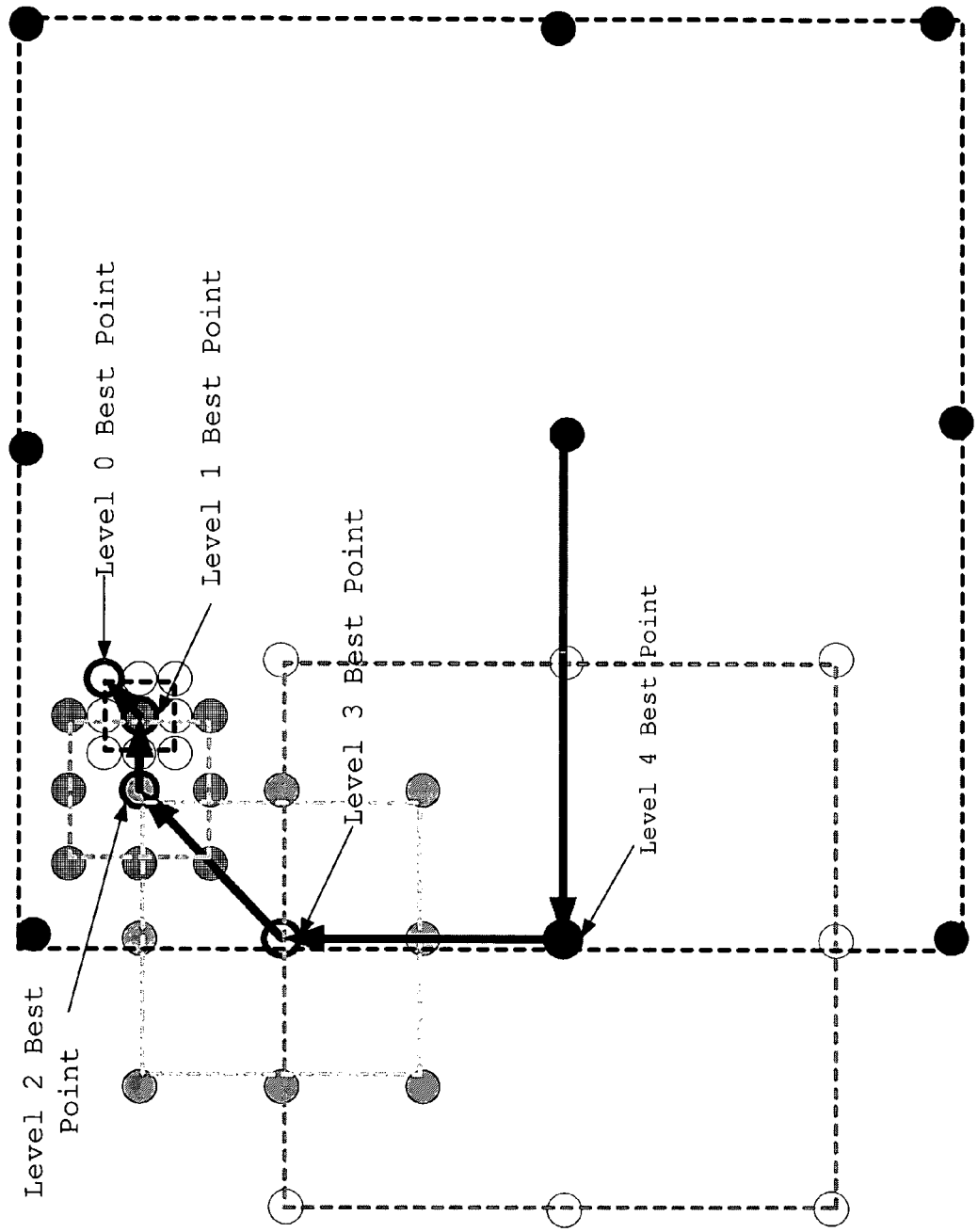
FIG. 8 illustrates an n-level hierarchical search, in accordance with one embodiment of the invention.

FIG. 8 shows an embodiment of this step in the invention to perform an n-level hierarchical search. At each level, eight points surrounding the best point from the upper level are evaluated. For search window =+/−128 case, we have:

Level 6: (64, 0), (−64, 0), (0, 64), (0, −64), (64, 64), (64, −64), (−64, 64), (−64, 64)

Level 5: ($\{0, +-32\}, \{0, +-32\}$) from the best point in Level 6

Level 4: ($\{0, +-16\}, \{0, +-16\}$) from the best point in Level 5

Level 3: ($\{0, +-8\}, \{0, +-8\}$) from the best point in Level 4

Level 2: ($\{0, +-4\}, \{0, +-4\}$) from the best point in Level 3

Level 1: ($\{0, +-2\}, \{0, +-2\}$) from the best point in Level 2

Level 0: ($\{0, +-1\}, \{0, +-1\}$) from the best point in Level 1

To save computation time, there is no need to search all the way down to level 0. Our experimental results show that stopping at level 3 (step size 8) already generates pretty good results. This process goes on until the final level is reached. The point with the lowest cost value during the N-Level hierarchical search is then compared with the best point from the detail search, and the one yielding the lower cost value is selected as the best ME search matching point.

It should be noted that the ME search steps illustrated in FIG. 4 are quite different from most of the commonly used fast searching methods. It is found that the unique combination and order of steps 401, 402, and 403 achieve close to full search results. Here the purpose of step 401 is to learn the MV found from the neighboring blocks to set the detail search starting point. The purpose of step 402 is to thoroughly evaluate the points surrounding the best starting point found in 401. This step also set a cost function value threshold for the next step. Step 403 goes out of the small detail search region to cover the whole search space trying to reach the neighborhood of good points if the detail search cannot find a point yielding a sufficiently low cost value.

The advantage of the ME procedure is that the search results from the previously evaluated blocks can be transferred to the blocks in their neighborhoods. This "Relay" effect propagates good results and enables some kind of local "Group Cooperation" between blocks to achieve global optimization, like the system dynamics observed in "Cellular Automata" systems (as taught on page 126 in the book by Stephen Wolfram, Theory and Applications of Cellular Automata, published by World Scientific Publishing Co. in 1986, which is hereby incorporated by reference) or "Neural Network" systems (as taught in chapter 5 of the book by Tsu-Chang Lee, entitled *Structure Level Adaptation for Artificial Neural Networks*, published by Kluwer Academic Publishers, 1991, which is hereby incorporated by reference).

Due to the large block data overlap between adjacent search point, one efficient approach to realize the fast search process described above is to implement a parallel array structure with certain carefully designed memory organization to evaluate multiple search points concurrently. The memory structure will need to be organized in such a way to be accessed by the processing array to retrieve random block locations in the reference frames within a minimum amount of cycles.

Fractional Grid Point Search Method

To further reduce the rate, we can perform fractional grid point search after the best integer grid point is found through performing the ME search procedure described above. In MPEG4 and H.264, multiple-tap interpolation functions are used to create h-pel pixels in q-pel mode. This is very computation intensive if performed in a ME search inner loop.

Figure 9:
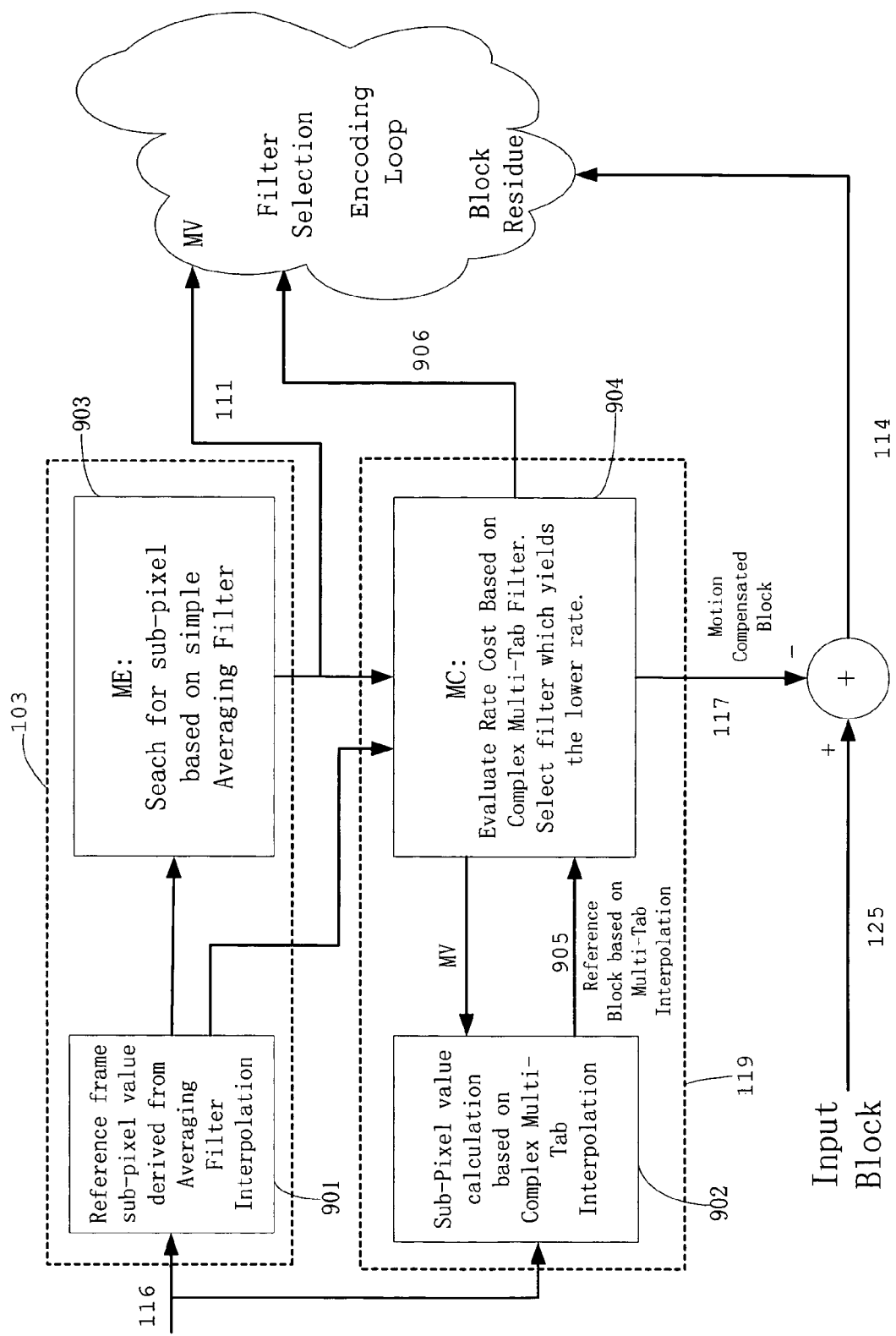
FIG. 9 illustrates an adaptive motion compensation filter selection, in accordance with one embodiment of the invention.

In one embodiment of the invention as shown in FIG. 9, a method to perform a ME search on the fractional points uses simplified interpolation. This method is applied for video encoding applications by using a simpler complexity filter 901 performing interpolation (called search interpolation) to generate the sub-pixel values for the ME search 903. After the best sub-pel point is found, the more complex multi-tap filter 902 performing interpolation (called coding interpolation) for the Motion Compensation 904 calculation is used. The result is experimentally very close to the result of a ME search using true multiple-tap filters. Another embodiment of the invention can enhance the results through an adaptive motion compensation filter selection.

Further bit rate improvement can be achieved by selecting the filter generating the lower rate in the MC process 904. In this case, the filter selection choice information 906 needs to be transmitted to the decoder so that the receiver side can be synchronized with the encoder. Another embodiment can extend this idea to allow the selecting of a filter from a set of filters in the MC step.

Figure 10:
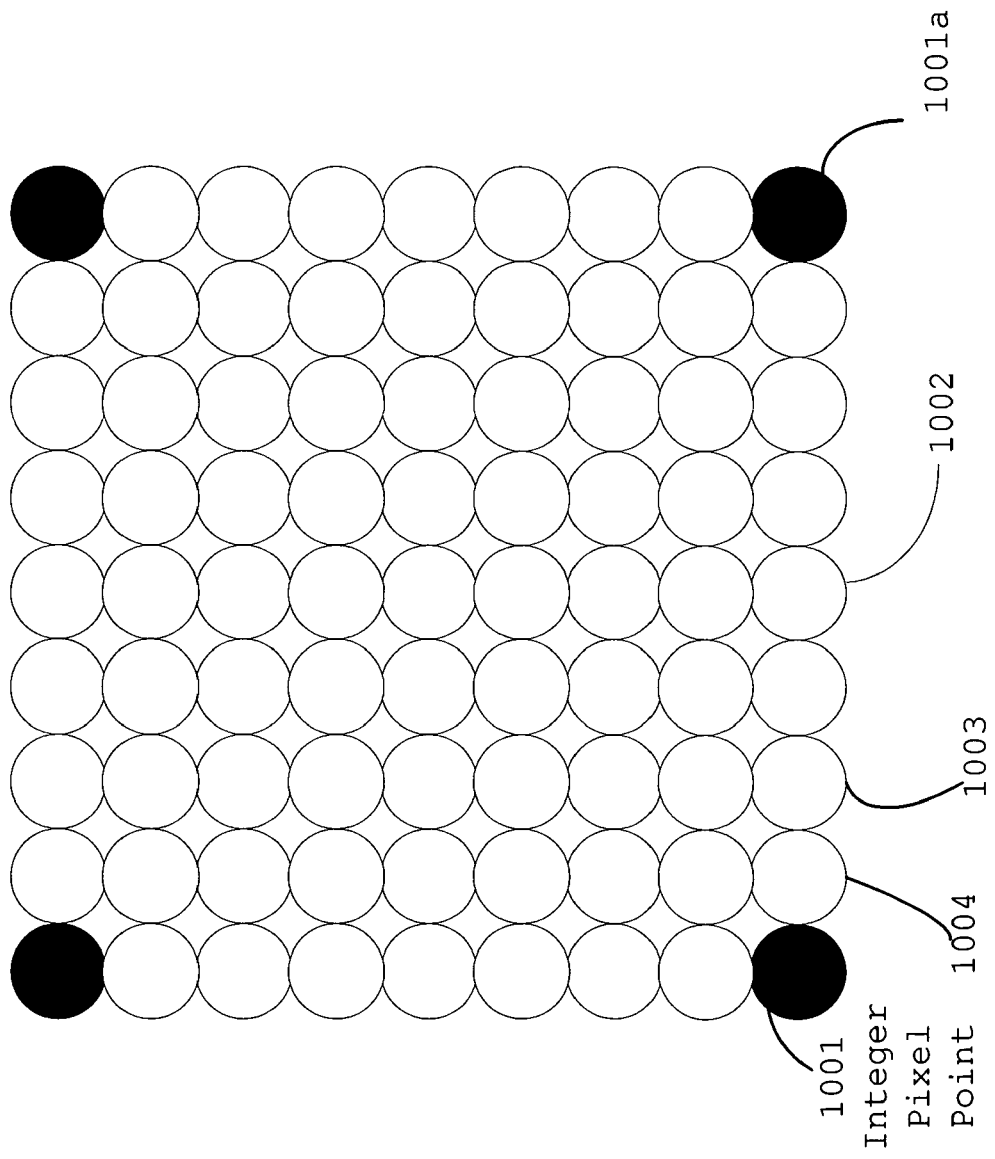
FIG. 10 illustrates an application of an averaging filter to calculate the sub-pixel values during a motion estimation search, in accordance with one embodiment of the invention.

FIG. 10 shows how to use averaging filter to calculate the sub-pixel values during a ME search. The pixel values are only available at the integer pixels (1001, 1001*a*, etc.), and the sub-pixel location can be interpolated. One embodiment of this invention uses bi-linear interpolation to calculate the sub-pixel values for ME search reference frame. In the particular example illustrated in FIG. 10, this produces:

Half-Pixel:

$$\text{Pixel Value at } 1002 = (\text{Pixel Value at } 1001 + \text{Pixel Value at } 1001a)/2 \quad (14)$$

Quarter-Pixel:

$$\text{Pixel Value at } 1003 = (\text{Pixel Value at } 1001 + \text{Pixel Value at } 1002)/2 \quad (15)$$

⅛-Pixel:

$$\text{Pixel Value at } 1004 = (\text{Pixel Value at } 1001 + \text{Pixel Value at } 1003)/2 \quad (16)$$

This method can be extended to $1/(2^n)$ pixel evaluation and further extended to process n-dimensional signal sequences.

Adaptive Encoder Control

The characteristics of the blocks of the input frames vary inside a frame and from frame to frame. One embodiment of this invention include a adaptive coding control unit to improve the quality and performance of the encoder based on feedback signals from the encoder outputs, and optionally from some block characteristic values monitored throughout the encoding process. This adaptive coding control unit can dynamically adjusts a plurality of coding parameters in the coding, according to some feedback parameter from the encoder.

As an example, the MV range distribution across blocks and frames are quite un-even. Since a larger MV means more ME search cycles, this observation can be interpreted as an un-even ME search cycle requirement across blocks and frames. In one embodiment of an adaptive encoder, methods can be implemented to allow cycle sharing among frames and blocks for better utilization of hardware processing cycles. The coding control unit may contain a motion estimator control unit to adaptively adjust the performance of the motion estimator.

Figure 11:
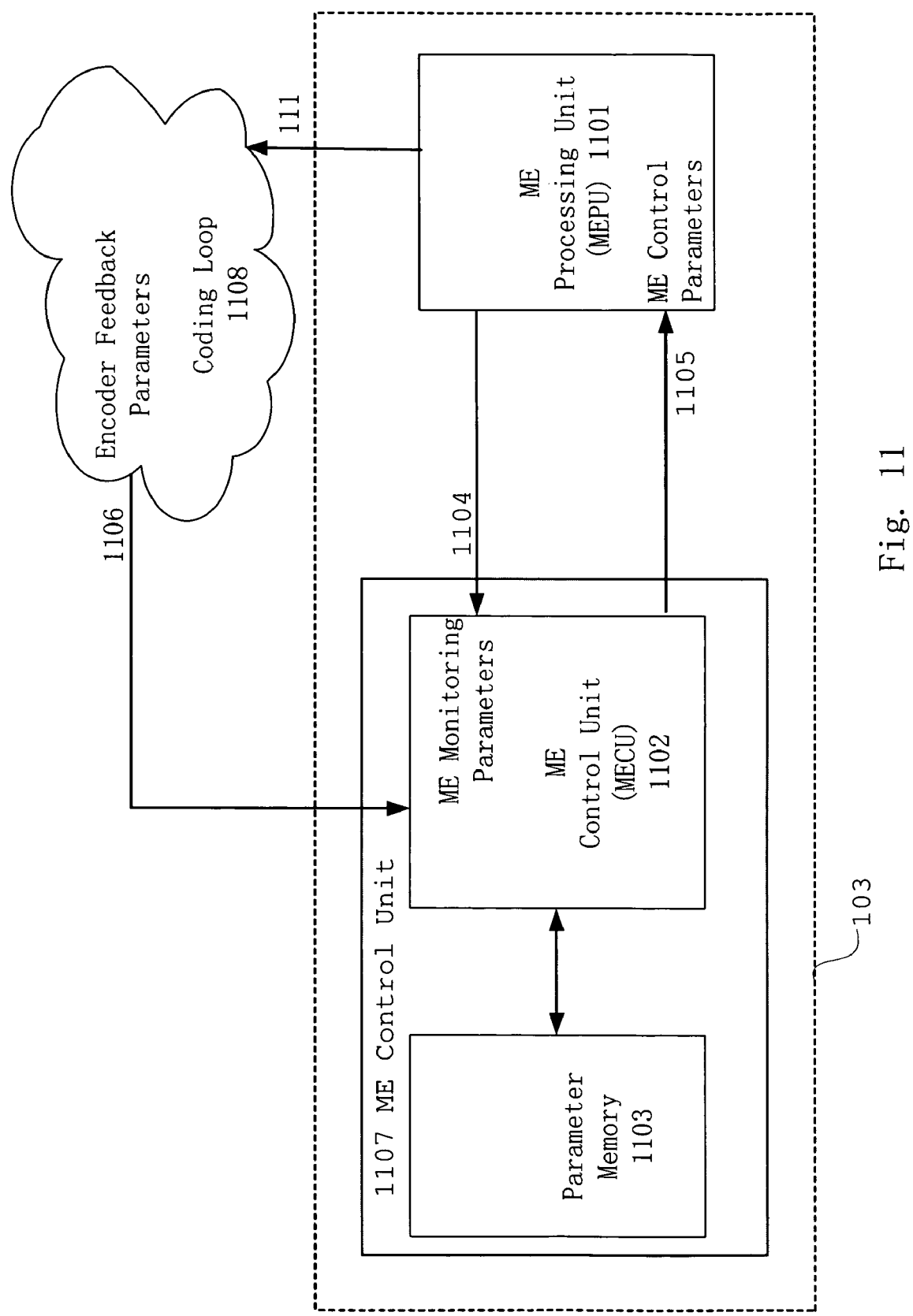
FIG. 11 illustrates an adaptive motion estimation (ME) control structure, in accordance with one embodiment of the invention.

FIG. 11 shows one embodiment of an adaptive ME control unit. ME Processing Unit (MEPU) 1101 is the engine to perform the ME search. The ME Control Function 1107 includes a ME Control Unit (MECU) 1102, which is the unit used to control MEPU 1101. MECU 1102 takes as inputs some ME Monitoring Parameters 1104 (including the MV, cost value, cycle used, and so forth), Encoder Feedback Parameters 1106 from coding loop 1108, and some adjustable parameters stored in Parameter Memory 1103, to create a set of ME Control Parameters 1105 (including window size, cycle allocation, termination criteria, and so forth), for adaptively controlling the MEPU 1101 for better utilization of MEPU cycles to achieve the optimal ME search objectives.

An alternative embodiment of the ME Control Function adjusts the ME search range for the current frame based on the MV values from the past frames. One purpose is to monitor the past X, Y (and Frame for H.264 case) motion vector values and enlarge or reduce the ME search range in each dimension (X, Y, or F) on the current frame. This "adaptive ME search window" adjustment method, can effectively reduce the bit rate needed to represent the motion vectors and, can reduce the number of cycles for a ME search.

Figure 12:
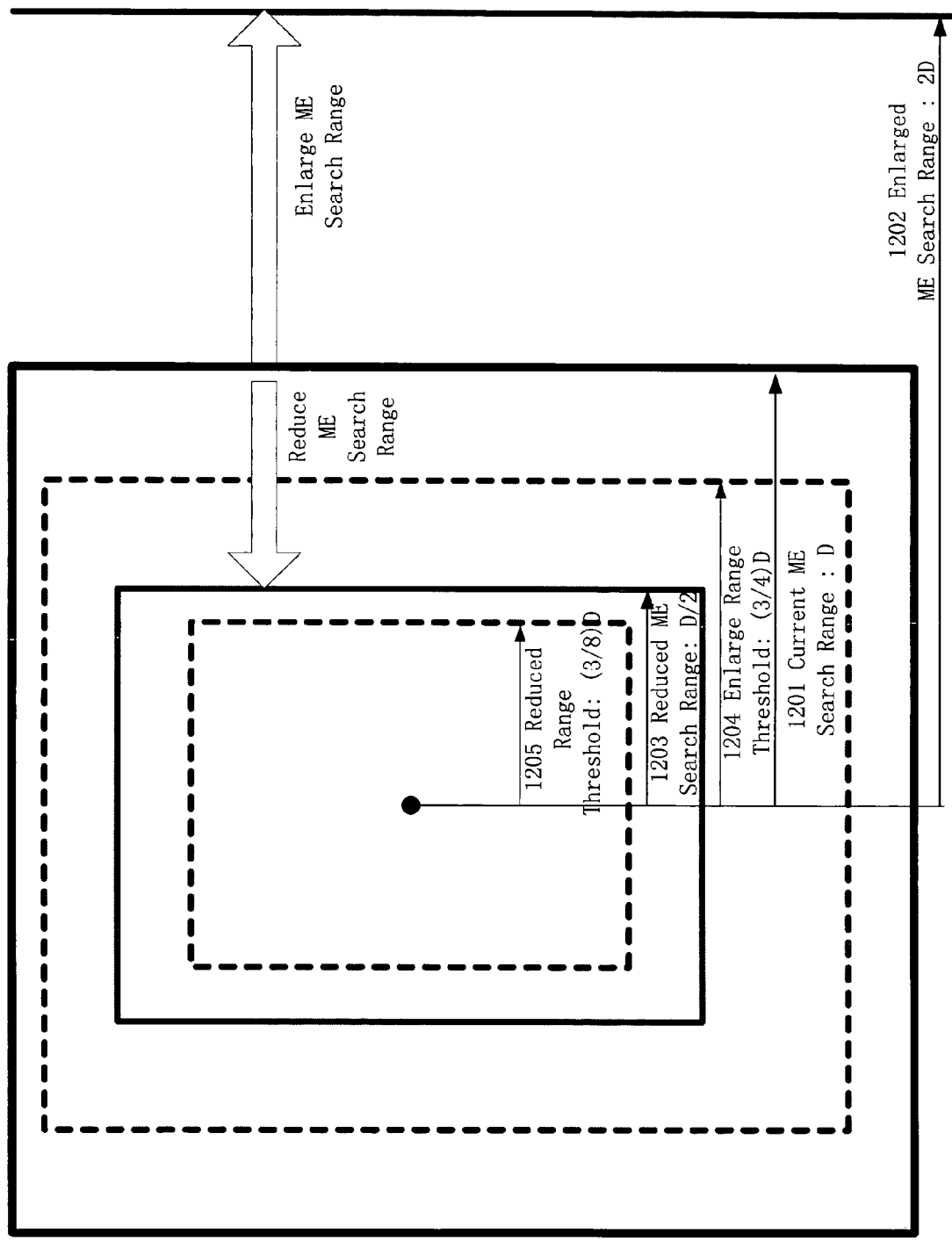
FIG. 12 illustrates a motion estimation search range adjustment method, in accordance with one embodiment of the invention.

FIG. 12 illustrates one example of this ME search range adjustment method. For a given current ME search range D 1201, the ME search range can be adjusted according to the following criteria:

1. If the number of MVs with range larger than the Enlarge Range Threshold 1204 (set to 3D/4 in this example) is larger than some pre-set threshold number, then enlarge the ME search range to 2D.
2. If the number of MVs with range larger than the Reduce Range Threshold 1205 (set to 3D/8 in this example) is smaller than some pre-set threshold number, then reduce the ME search range to D/2.

One embodiment uses the method illustrated in FIG. 12 to adjust the ME search range in each independent ME search dimension (X, Y, and possibly F for H.264 multi-frame cases). In addition to the adaptive ME search range method specified above, one embodiment of the invention "Early Terminates" the ME search for each block when certain condition is met to save processing cycles. The processing cycles saved from "Early Termination" will be added to the available cycle pool. MECU will base on the cycles available in the pool to allocate and schedule the cycles for the MEPU to use. The purpose is to fully utilize the available processing cycles to achieve the best ME search results.

Figure 13:
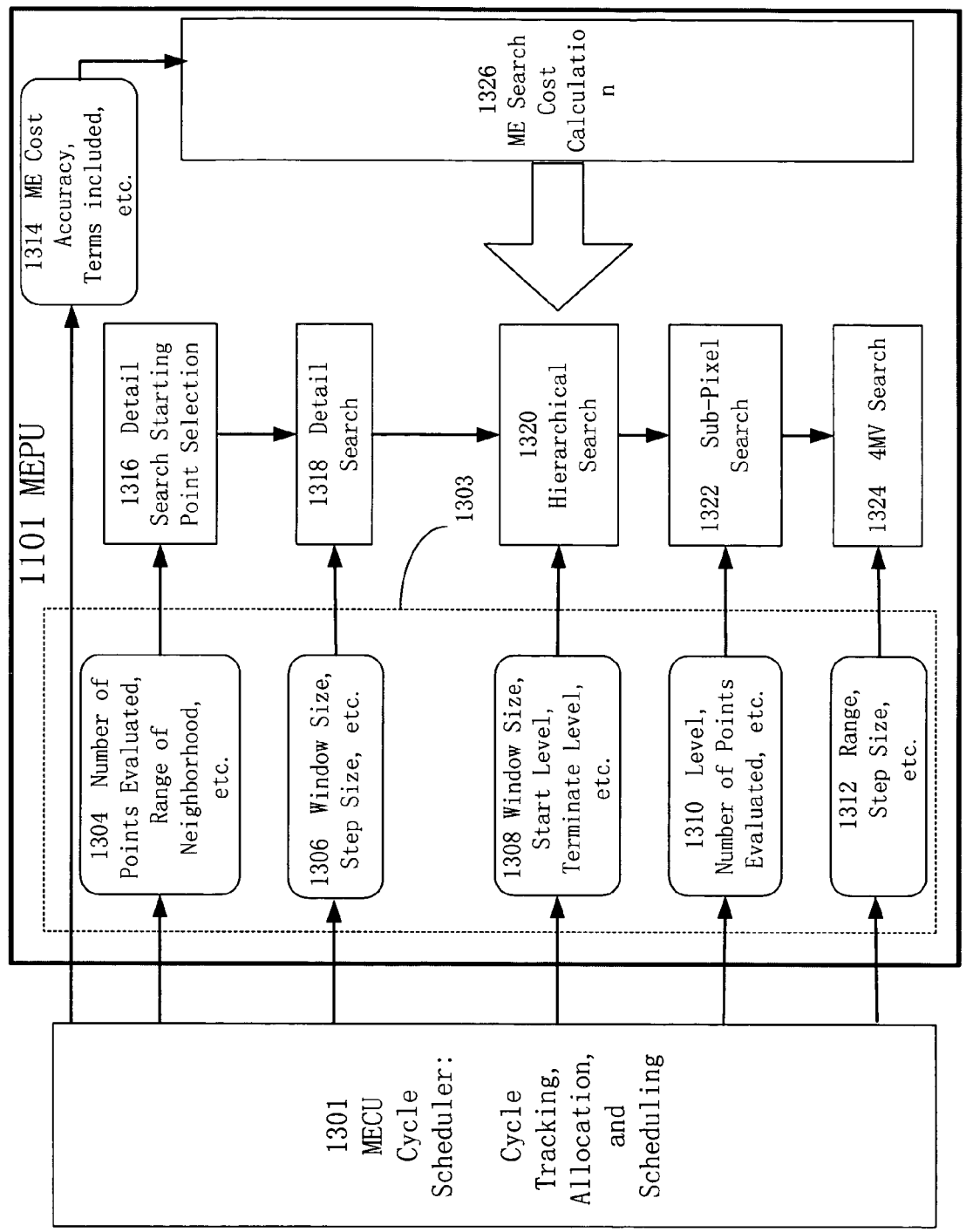
FIG. 13 illustrates a motion estimation processing unit (MEPU) cycle scheduler, in accordance with one embodiment of the invention.

FIG. 13 shows an embodiment of the MEPU cycle scheduler 1301. The MECU cycle scheduler adjusts the ME search control parameters 1303 for the modules in MEPU 1101 based on the cycles available in the cycle pool. The ME search control parameters 1303 include 1304 the number of points evaluated, the range of the neighborhood, and so forth; 1306 window size, step size, and so forth; 1308 window size, start level, terminate level, and so forth; 1310 the level, number of points evaluated, and so forth; and 1312 the range, step size, and so forth. These search control parameters are used, respectively, in 1316 detail search starting point selection, 1318 detail search, 1320 hierarchical search, 1322 sub-pixel search, and 1324 4MV search. The MECU cycle scheduler provides 1314 ME cost accuracy, terms, and so forth to the 1326 ME search cost calculation.

Three possible "Early Termination" embodiments are:

1. SKIP situation: Check the current block against the block at the same location in the reference frame. If both blocks are "similar", then the ME processing can be skipped. In this situation, we skip the major part of the video-encoding loop (including ME, DCT, etc.) and save a lot of cycles. One embodiment of our "Similarity Criteria" for SKIP is:
   a. Calculate block difference [BD] between the current block and the block at the same location in the reference frame.
   b. Calculate DC[BD] and AC[BD]
   c. If DC[BD]/QP_dc<SKIP_DC_TH AND AC[BD]/QP_ac<SKIP_AC_TH, then SKIP. SKIP_DC_TH and SKIP_AC TH are some thresholds to determine the SKIP condition. SKIP_DC_TH and SKIP_AC_TH can be fixed or dynamically adjustable according to certain feedback signals from the encoder. As an example, in one embodiment of this invention, SKIP_AC TH is set to the dynamically adjusted AC_THRESHOLD value specified above.

2. Good Match Termination: At any moment during the ME search for a certain block, when the cost function value is lower than certain threshold J_Early_Terminate_TH, one embodiment of the invention terminates the ME search. This happens when a very good block match is found, which results in a low cost function value. J_Early_Terminate_TH can be a pre-fixed value or dynamically adjustable based on the certain characteristic value of the encoder. For example, in one embodiment of the invention, $$J\_Early\_Terminate\_TH = f * J\_Best\_Mean \quad (17)$$

where f is positive number less than 1, which is used to control the J_Early_Ternimate_TH; J_Best_Mean is the moving average value of J_Best through a certain moving sampling window. In one embodiment of this invention, J_Best_Mean can be calculated simply by the following formula:

$$J\_Best\_Mean = \alpha * J\_Best + (1-\alpha) * J\_Best\_Mean \quad (18)$$

Where $\alpha$ is a small number less than 1 used to control the width of the moving averaging window.

3. ME Search Give up Termination: This happens if further ME search is not likely to produce better results than the best cost value J_Best found so far. When this happens, there is no need to waste cycles to search more points for that particular block. This can be evaluated by some lower bound estimation for future search points. If the lower bound for future search points is larger than the best cost found so far, we can terminate the search without sacrificing anything. This idea can be considered as applying the A* search algorithm, which is used frequently in game tree searching, to ME searching. For example, see chapter 2 of the book by Nils J. Nilsson, entitled *Principles of Artificial Intelligence*, published by Morgan Kaufmann in 1986, which is hereby incorporated by reference. The following embodiments are an application of this idea into the ME search problem:

a. After finishing the 1MV search and prior to 4MV search, the 4MV search is terminated if best cost value found from 1MV is smaller than the motion vector rate, i.e., $$J\_Best(1MV) <= R\_MV(4MV) \quad (19)$$

Figure 14:
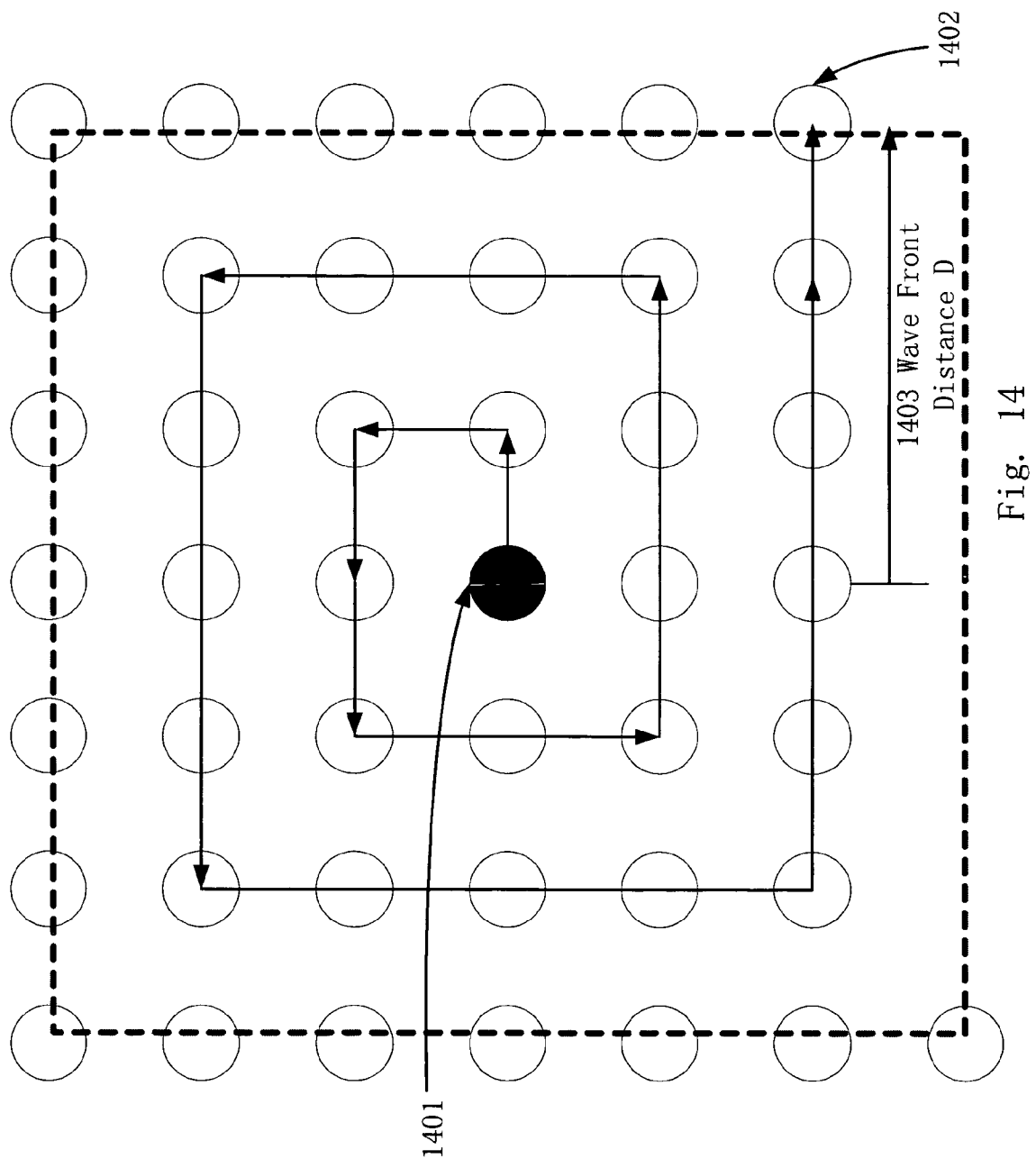
FIG. 14 illustrates a motion estimation search following a spiral wave expansion pattern, in accordance with one embodiment of the invention.

This is because $$R\_MV(4MV) < J(4MV) = R\_DC(4MV) + R\_AC(4MV) + R\_MV(4MV) \quad (20)$$

b. In MPEG4, if a ME search is performed following some spiral pattern from the ME prediction point, then R_MV(MV) would be sorted from the search starting point in increasing order of the rate for the motion vectors. Under this condition, the ME search process can be terminated if the rate for the motion vector is larger than the best cost found so far. This is illustrated in FIG. 14. The ME search starts from some prediction point 1401. As illustrated in FIG. 14, the ME search follow a spiral wave expansion pattern. In MPEG4, the MV is coded as the difference from the prediction point: R_MV=R_MV_X(Delta_X)+R_MV_Y(Delta_Y). R_MV_X( ) and R_MV_Y( ) follow the same VLC table R_MV(Delta) and both are monotonically increasing with Delta. In FIG. 14, if the R_MV(D)>=J_Best (the best cost value found so far), when ME search wave expansion reaches the Wave Front 1402, the search can be terminated, since all the future R_MV( ) will be larger than R_MV(D).

An alternative embodiment of the invention applies the A* search method to prune off the number of points to be evaluated in the search process. In general, if the cost function J(p) at any given point p is larger than certain bound B(p) (which is the bounding function for J at point P), and if B(p)>J_Best, the best cost function value found so far, then the point p can be skipped without sacrificing any quality. If we perform our search process to visit points in ascending of B(p), then at any given moment, if B(p)>J_Best is satisfied, the calculation for point p can be stopped. A similar concept was discussed in U.S. Pat. No. 5,363,313 (entitled *Multiple-Layer Contour Searching Method and Apparatus for Circuit Building Block Placement*, invented by Tsu-Chang Lee), which shows a practical application of using the bounding function to prune off search points for block placement in IC layout. In MPEG4 coding standard, MV bit rate is monotonically increasing with the X and Y length of the motion vector, hence if we use Rate(MV) as the bounding function for the search point and order our search sequence according some "spiral" pattern, then we can use Rate(MV) as early termination cost bound.

Neighborhood Preserving Scanning Method

It was taught by Tsu-Chang Lee in Ch.5 *An Adaptive Neural Network Source Coder* of the book *Structure Level Adaptation for Artificial Neural Neural Networks*, published by Kluwer Academic Publishers, 1991, that preserving the natural neighborhood relationship in adaptive artificial signal processing structures can drastically enhance the system quality, performance, and system learning behavior Applying a similar idea to the n dimensional signal sequence encoding problem, one embodiment of this invention is to scan and process the blocks according to certain sequence to preserve the spatial and temporal distance order relationship.

Figure 16:
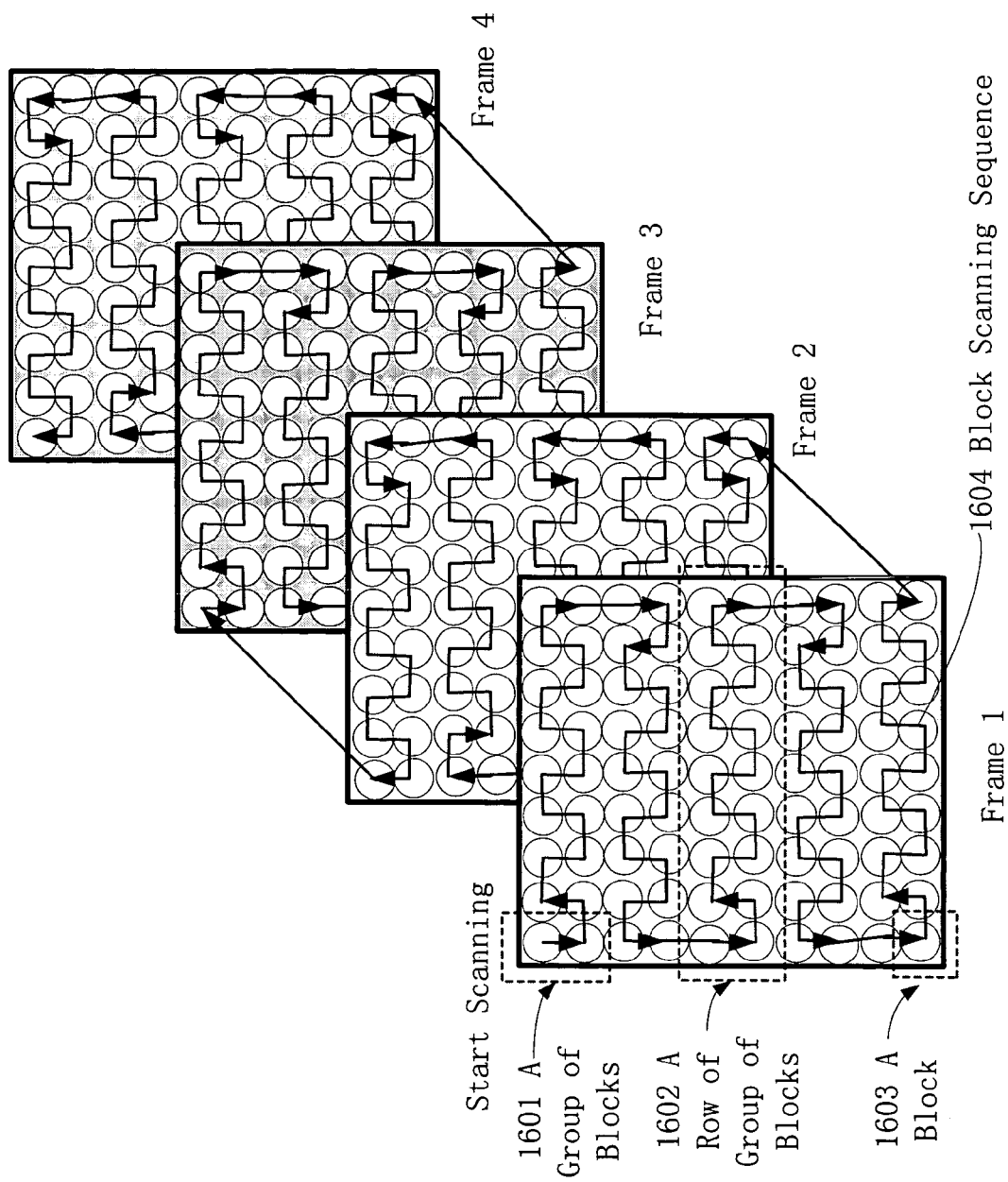
FIG. 16 illustrates a "neighbor preserving" scanning method in two-dimensional video sequence processing, in accordance with one embodiment of the invention.

One embodiment of this invention is applying similar concepts discussed in the book mentioned above to our n dimensional signal encoding problem. FIG. 16 shows one embodying this "Neighbor Preserving" scanning method in two-dimensional video sequence processing. Here the blocks 1603 are scanned and processed according to the order as shown 1604. This method is specified as the following:
  (a) Scan a row of group of n blocks, where n is a positive integer. Start the next row of group of the blocks from the location where the previous row end.
  (b) After finishing scanning one frame, start the next frame scanning from the location where the previous frame ends and scan the rows in the reverse order as the previous frame. Repeat (a) and (b) for each frame.

This embodiment of a scanning process can preserve the neighbor relationship in the scanned sequence, i.e., the neighboring blocks in the one-dimensional sequence after scan are also spatial or temporal neighbors in the original N-dimensional sequence. In general, the neighborhood-preserving scan maximizes the matching of the following conditions:
  (a) The neighboring blocks in the one-dimensional sequence after scan are also neighbors in the original N-dimensional sequence.
  (b) Two blocks are considered neighbors, if they are adjacent blocks in the same frame (spatial neighbor), and at the same location in adjacent frames (temporal neighbor).

In one embodiment of the invention, the scanning method can be used hierarchically. In this embodiment, each N-dimensional block can also be scanned by the same method within itself. In general, it is possible to use a multi-level hierarchy for this scanning method.

One proposed neighborhood preserving scan method can also be applied to the peripheral image scanning devices, such as one or more CCD sensors and/or one or more CMOS sensors to prepare the input signals to match the signal processing order. This way, it is possible to remove the frame buffer from the input sensing devices.

Figure 18:
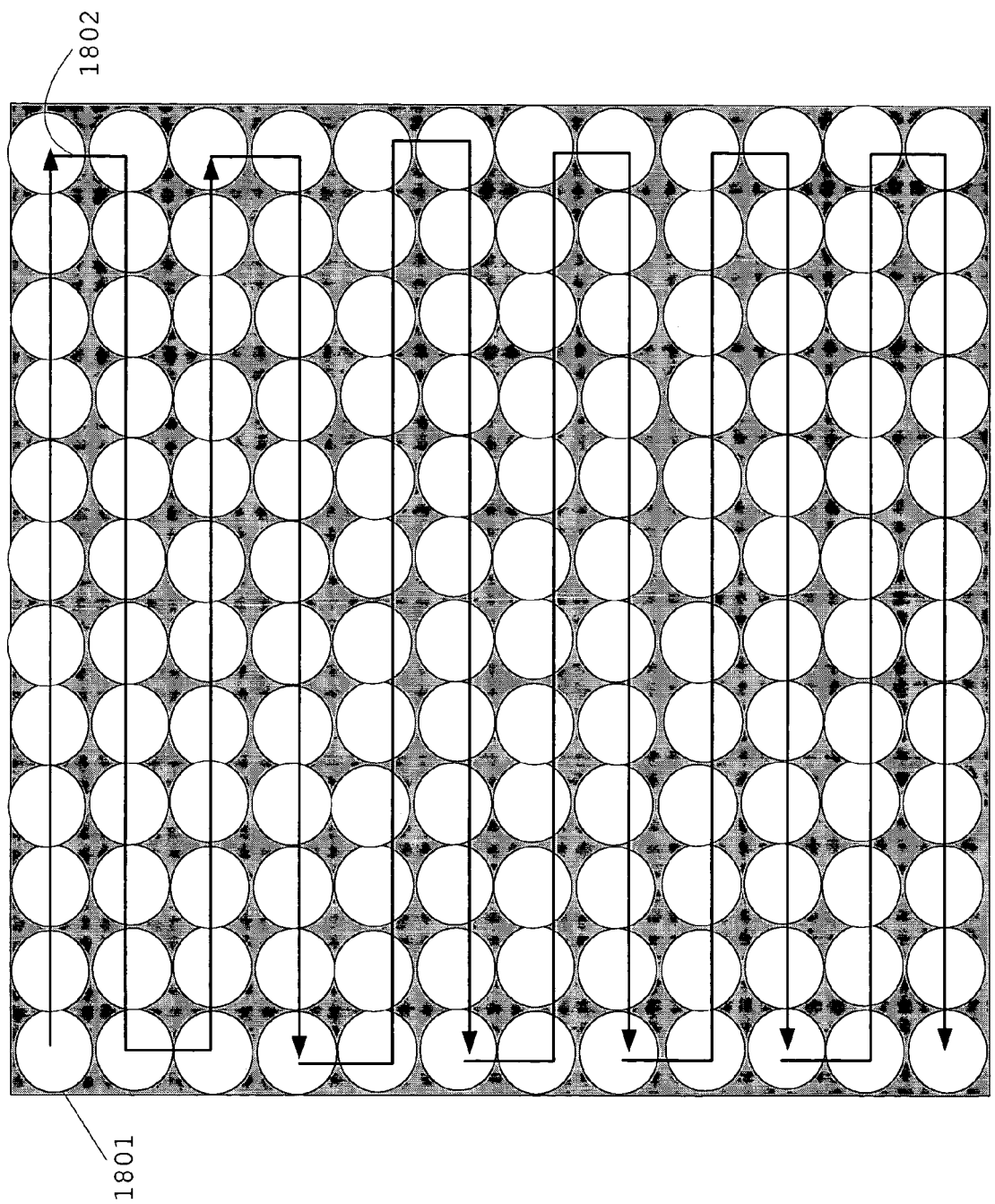
FIG. 18 illustrates a scanning method including CMOS or CCD image scanning, in accordance with one embodiment of the invention.

FIG. 18 shows an embodiment of a scanning method including CMOS or CCD image scanning. Here the light signals sensed at each pixel 1801 are scanned out in the neighborhood preserving order 1802.

FIG. 19A illustrates the encoding flowchart for n dimensional encoding, in accordance with one embodiment of the invention. The method begins in step 1901, which includes encoding of the n dimensional signal sequence header. Step 1902 is next, including the adjustment of the frame control parameters for each frame. Step 1903 is next and includes the encoding of the frame header information. Step 1904 is next, which includes selecting the next block in the frame according to a "scanning pattern" to optimize certain performance criteria. Step 1905 is next, which includes a motion estimator. Step 1906 is next and includes motion compensation. Step 1907 is next, which includes calculating the n dimensional residue matrix. Step 1908 is next and includes performing an n dimensional coefficient de-correlating transform on the residue matrix. Step 1909 is next, which includes scanning the transformed residue matrix to generate run-level symbols. Step 1910 is next, which includes VLC entropy coding the run-level symbols and the motion vector. Step 1911 is next, which includes assembling a coded block according to a pre-defined format. Step 1912 is next, which includes block context learning based on the methods taught earlier in this invention. At the end of the block, the steps are repeated starting from step 1904 for the next block. The next step after all the next blocks in a frame are processed is step 1913, which includes frame wrapping and updating the frame context states. At the end of the frame, the steps are repeated starting at step 1902 for the next frame.

FIG. 19B illustrates the motion search flowchart, in accordance with one embodiment of the invention. The method begins at step 19030. The next step is 19014, which includes selecting the next location in the search space. The next step is step 19015 and includes calculating the search objective function. The next step is step 19016, which includes updating the best cost and state. Step 19017 is next and includes checking for a SKIP or early termination condition. If there is no SKIP or early termination condition, then the method is repeated, starting at step 19014. If there is a SKIP or early termination condition, then the motion search ends in step 19031.

Step 19015 in FIG. 19B can be further divided into steps 19018 and 19019. Step 19018 includes computing the accurate components of the objective function, and step 19019 includes computing the estimated components of the objective function. Step 19019 can be further divided into steps 19020 and 19021. Step 19020 includes decomposing the objective function into contributing components, and step 19021 includes computing each contributing component of the objective function with parameters from block context learning.

In the description herein, numerous specific details are provided, such as the description of system components and methods, to provide a thorough understanding of embodiments of the invention. One skilled in relevant arts will recognize, however, that the invention can be practiced without one or more of the specific details, or with other systems, methods, components, materials, parts, and the like. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:

1. A block matching n dimensional signal sequence processing system, comprising (n D encoder):
  an n dimensional frame buffer to store at least one frame in a sequence for prediction, including at least one reference frame other than the current frame in the sequence for prediction, where n is a positive integer;
  an n dimensional motion estimator (ME), which is capable to determine the motion vector (MV) referring to a location in at least one reference frame from a current block to achieve at least one target system objective, wherein the motion estimator searches a plurality of points in a plurality of reference frames to achieve at least one objective by searching including at least one neighbor exploit function to exploit at least one search result obtained by a selected set of neighbor exploit set blocks close to the current block, and the motion estimator receives as input for the search process at least one motion vector of a plurality of motion vectors of the blocks in the neighbor exploit set for the current block, wherein the motion estimator performs a detail search function to explore in detail a region around the best point found in the neighbor exploit function;
  a motion compensated predictor (MC) to generate the prediction block from at least one reference frame from the frame buffer based on the motion vector determined by the motion estimator;

an n dimensional block encoder to encode the block prediction difference (residue) between the current block and a prediction block and encode a motion vector; and a sequence wrapper to wrap a plurality of encoded blocks together into a uniquely defined frame sequence format.

2. The block matching n dimensional signal sequence processing system of claim 1, further comprising (n D decoder):

an n dimensional frame buffer to store at least one decoded frame other than a current frame in the sequence for recovering the n dimensional signal sequence, where n is a positive integer;

a sequence un-wrapper to un-wrap an encoded frame sequence into a sequence of encoded blocks according to a uniquely defined frame sequence format; and a block decoder to receive an encoded block and reconstruct the n dimensional signal block by decoding the residue (block prediction difference) and the motion vector to reconstruct the n dimensional signal block.

3. The system of claim 1, wherein the at least one target system objective includes minimizing entropy, where entropy measures the amount of additional information (in bits) needed to encode the current block, calculated from at least one reference frame.

4. The system of claim 3, wherein the system is adapted for use in encoding a plurality of two-dimensional video sequences.

5. The system of claim 1, wherein at least one target system objective can be achieved by minimizing a cost function, which contains at least one estimation portion and at least one accurate portion for evaluating at least one system objective.

6. The system of claim 5, wherein at least one estimation portion is based on the linear combination of a plurality of characteristic values of residue and states of the motion estimator.

7. The system of claim 5, wherein the cost function is based on at least one table lookup with a plurality of table entries specified by at least one characteristic value of the block prediction difference and at least one state of the motion estimator.

8. The system of claim 1, wherein the neighbor exploit function evaluates at least one target system objective for the current block using the plurality of motion vectors in the neighbor exploit set.

9. The system of claim 1, wherein the motion estimator performs a global search, after a threshold is established to evaluate the plurality of points in the global search.

10. The system of claim 1, wherein the system is adapted for use in encoding at least one two-dimensional video sequence.

11. The system of claim 1, wherein the motion estimator includes a fractional point prediction on a plurality of fractional points.

12. The system of claim 11, wherein the signals on the plurality of fractional points, in at least one reference frame, are interpolated from a plurality of grid points on at least one reference frame.

13. The system of claim 12, wherein the motion estimator evaluates the fractional points based on a search interpolation to select the best point, and the motion compensator (MC) calculates the block prediction difference (residue) from a coding interpolation.

14. The system of claim 13, wherein the coding interpolation is adaptively selected from a set of interpolations to optimize at least one target system objective.

15. The system of claim 13, wherein the system is adapted for use in encoding two-dimensional video sequences.

16. The system of claim 1, further comprising: an adaptive coding control unit, which dynamically adjusts a plurality of coding parameters in the coding, according to at least one feedback parameter from the encoder.

17. The system of claim 1, wherein at least one target system objective can be achieved by minimizing a parameterized cost function, and at least one parameter in which can be adjusted (or calculated) based on at least one feedback signal from the encoder.

18. The system of claim 17, wherein at least one criteria selected from the group of following criteria is used to select at least one input variable for the cost function:

(a) Simplicity criteria: the input variables have to be easily extractable from the search states during the ME search process;

(b) Relevancy criteria: the input variables have to be selected based on the degree of relevancy to the target objective cost;

(c) Divide and conquer refinement criteria: decompose a cost function J into separable contributing component functions J1, J2, . . . ;

(d) Input variables factoring criteria: decompose a input parameter Xi into separable contributing components Xi1, Xi2, to create more input variables for better accuracy and control/tracking; and (e) Simple substitute criteria: if one input parameter Xi is difficult to obtain or too expensive to calculate, it can be substituted by a simpler variable Xi'.

19. A block matching n dimensional signal sequence processing system, comprising (n D encoder):

an n dimensional frame buffer to store at least one frame in a sequence for prediction, including at least one reference frame other than the current frame in the sequence for prediction, where n is a positive integer;

an n dimensional motion estimator (ME), which is capable to determine the motion vector (MV) referring to a location in at least one reference frame from a current block to achieve at least one target system objective;

a motion compensated predictor (MC) to generate the prediction block from at least one reference frame from the frame buffer based on the motion vector determined by the motion estimator;

an n dimensional block encoder to encode the block prediction difference (residue) between the current block and a prediction block and encode a motion vector; and a sequence wrapper to wrap a plurality of encoded blocks together into a uniquely defined frame sequence format, wherein at least one target system objective can be achieved by minimizing a parameterized cost function, and at least one parameter in which can be adjusted (or calculated) based on at least one feedback signal from the encoder, wherein at least one parameter in the cost function can be obtained through a supervised learning method which repetitively adjusts at least one parameter in the cost function based on the error between the actual objective cost value derived from the encoder results and the estimated objective cost value calculated by the parameterized cost function.

20. A method to compress n dimensional frames, comprising:

storing at least one n dimensional frame in a sequence for prediction, including at least one reference frame other than the current frame in the sequence for prediction, where n is a positive integer;

scanning the frame sequence by using an n dimensional block scanner to pick up the current block according to certain pre-defined scanning order;

achieving at least one target system objective by using an n dimensional motion estimator (ME), which is capable of determining the motion vector (MV) referring to a prediction block in the reference frames from a current block;

using motion compensated predictor (MC) to generate the prediction block from at least one reference frame from the frame buffer based on the motion vector (MV) determined by the motion estimator (ME);

encoding the block prediction difference (residue) between the current block and the prediction block and encoding a motion vector; and wrapping a plurality of encoded blocks together into a uniquely defined frame sequence format, wherein a hierarchical scanning process is included to scan a sequence of n dimensional frames, and scanning a sequence of n dimensional frames includes a neighborhood preserving scanning, which satisfies the following conditions:

(a) The neighboring blocks in the one-dimensional block sequence after scanning are also neighboring blocks in the original N-dimensional frame sequence: and (b) Two blocks are considered neighbors. if they are adjacent blocks in the same frame (spatial neighbor), and at the same location in adjacent frames (temporal neighbor).

21. The method of claim 20, wherein the method to compress n dimensional frames is adapted for use in encoding two-dimensional video sequences.

22. The method in claim 20, further comprising: scanning a two dimensional video sequence,
(a) starting a next row of group of the blocks from the location where a previous row ends, and
(b) scanning one frame, and starting the next frame scanning from the location where the previous frame ends and scanning the rows in the reverse order as the previous frame, repeating (a) and (b) for each frame.

23. The method of claim 20, further comprising: estimating an encoder cost function using pre-collected output data from the encoder.

24. The method of claim 20, further comprising: modeling an entropy cost value by a cost function including one or more steps chosen from the group of following steps, motion estimation searching, fractional grid motion estimation searching, a motion estimation searching including neighborhood preserving block scanning, and adaptive coding.

* * * * *